(12) United States Patent
El-Toufaili et al.

(10) Patent No.: US 9,068,023 B2
(45) Date of Patent: Jun. 30, 2015

(54) CONTINUOUS PROCESS FOR THE SYNTHESIS OF GRAFT POLYMERS BASED ON POLYETHERS

(71) Applicant: BASF SE, Ludwigshafen (DE)

(72) Inventors: Faissal-Ali El-Toufaili, Ludwigshafen (DE); Michaela Heussler, Hassloch (DE); Christian Schwede, Weinheim (DE); Aaron Flores-Figueroa, Mannheim (DE); Rainer Dobrawa, Stuttgart (DE); Dieter Boeckh, Limburgerhof (DE); Wolfgang Loth, Bad Durkheim (DE); Gerd Konrad, Speyer (DE)

(73) Assignee: BASF SE (DE)

( * ) Notice: Subject to any disclaimer, the term of this patent is extended or adjusted under 35 U.S.C. 154(b) by 2 days.

(21) Appl. No.: 13/787,949

(22) Filed: Mar. 7, 2013

(65) Prior Publication Data
US 2013/0253089 A1 Sep. 26, 2013

Related U.S. Application Data

(60) Provisional application No. 61/608,668, filed on Mar. 9, 2012.

(51) Int. Cl.
*C08F 283/06* (2006.01)
*C08F 2/01* (2006.01)
*B01J 19/24* (2006.01)

(52) U.S. Cl.
CPC ............... *C08F 2/01* (2013.01); *C08F 283/06* (2013.01)

(58) Field of Classification Search
CPC .................. C08F 2/01; C08F 283/06

USPC ........ 523/324; 525/52, 63, 404; 422/131, 134
See application file for complete search history.

(56) References Cited

U.S. PATENT DOCUMENTS 4,110,521 A * 8/1978 Barnett et al. ................. 526/64
4,209,599 A 6/1980 Brady et al.
(Continued)

FOREIGN PATENT DOCUMENTS

DE 1077430 B 3/1960
DE 19814739 A1 10/1999
(Continued)

OTHER PUBLICATIONS

Brandrup E., et al., "Applications: Free Radical Initiators", Polymer Products from Aldrich, "Polymer Handbook", 4th Edition, (1999).

*Primary Examiner* — Fred M Teskin
(74) *Attorney, Agent, or Firm* — Drinker Biddle & Reath LLP

(57) ABSTRACT

The invention relates to a continuous process for the preparation of amphiphilic graft polymers, wherein a vinyl ester component (B) composed of vinyl acetate and/or vinyl propionate (B1) and, if desired, a further ethylenically unsaturated monomer (B2), is polymerized in the presence of a polyalkylene oxide (A), a free radical-forming initiator (C) and, if desired, an additive (D), at a mean polymerization temperature at which the initiator (C) has a decomposition half-time of from 1 to 500 min, in at least one tubular reactor segment with a feed side and an outlet side, through which the reaction mixture comprising at least a part of component (A) to (C), and if desired (D), streams, a tubular reactor segment and the use of the inventive amphiphilic graft polymer. The invention further relates to an inventive amphiphilic graft polymer and the use thereof.

22 Claims, 10 Drawing Sheets

(56) References Cited

U.S. PATENT DOCUMENTS

Figure 1:
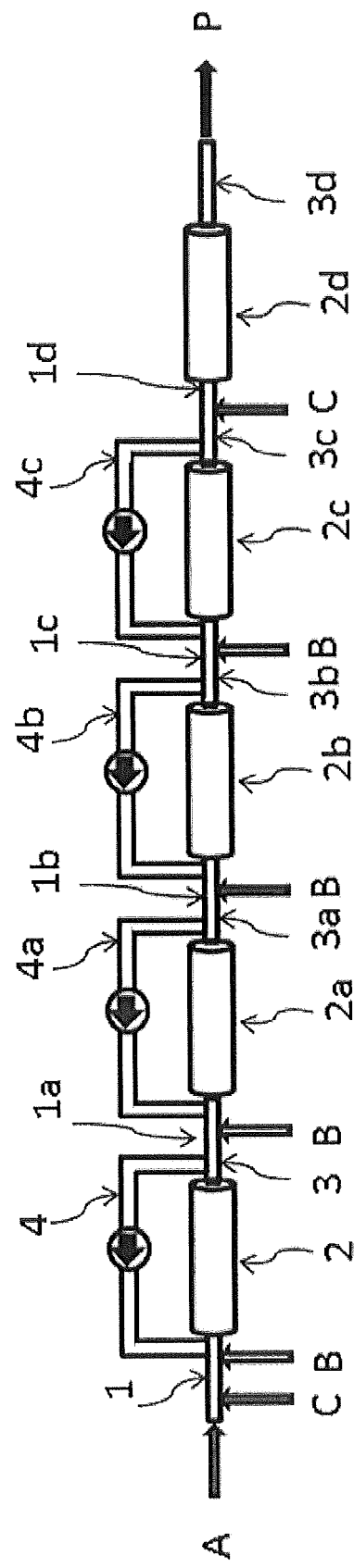

| | | |
|---|---|---|
| 4,746,456 A | 5/1988 | Kud et al. |
| 4,846,994 A | 7/1989 | Kud et al. |
| 4,846,995 A | 7/1989 | Kud et al. |
| 4,904,408 A | 2/1990 | Kud et al. |
| 5,194,525 A * | 3/1993 | Miura et al. .................. 526/64 |
| 6,162,879 A | 12/2000 | Galewski |
| 6,271,307 B1 | 8/2001 | Huff et al. |
| 2010/0204425 A1 | 8/2010 | Mertoglu et al. |
| 2011/0054071 A1 | 3/2011 | Mattmann et al. |
| 2012/0214941 A1 | 8/2012 | Kleiner et al. |

FOREIGN PATENT DOCUMENTS

| | | |
|---|---|---|
| DE | 10245858 A1 | 4/2004 |
| DE | 102006055473 A1 | 7/2007 |
| EP | 219048 A2 | 4/1987 |
| EP | 285037 A2 | 10/1988 |
| EP | 285038 A2 | 10/1988 |
| EP | 285935 A1 | 10/1988 |
| EP | 0903175 A2 | 3/1999 |
| GB | 922457 A | 4/1963 |
| WO | WO-2007138053 A1 | 12/2007 |
| WO | WO-2007138054 A1 | 12/2007 |
| WO | WO-2009013202 A1 | 1/2009 |
| WO | WO-2009133186 A1 | 11/2009 |
| WO | WO-2011054789 A1 | 5/2011 |
| WO | WO-2011067076 A1 | 6/2011 |

\* cited by examiner

US 9,068,023 B2

CONTINUOUS PROCESS FOR THE SYNTHESIS OF GRAFT POLYMERS BASED ON POLYETHERS

CROSS-REFERENCE TO RELATED APPLICATIONS

This application claims the benefit of U.S. Provisional Application 61/608,668, filed Mar. 9, 2012, which is incorporated herein by reference.

BACKGROUND OF INVENTION

The invention relates to a continuous process for the preparation of amphiphilic graft polymers, wherein a vinyl ester component (B) composed of vinyl acetate and/or vinyl propionate (B1) and, if desired, a further ethylenically unsaturated monomer (B2), is polymerized in the presence of a polyalkylene oxide (A), a free radical-forming initiator (C) and, if desired, an additive (D), at a mean polymerization temperature at which the initiator (C) has a decomposition half-time of from 1 to 500 min, in at least one tubular reactor segment with a feed side and an outlet side, through which the reaction mixture comprising at least a part of component (A) to (C), and if desired (D), streams, a tubular reactor segment and the use of the inventive amphiphilic graft polymer. The invention further relates to an inventive amphiphilic graft polymer.

BACKGROUND OF THE INVENTION

Graft polymers based on polyalkylene oxides and vinyl esters, in particular vinyl acetate, are known from DE-B-1 077 430 and GB-B-922 457. They are prepared by polymerizing the vinyl ester in the presence of the polyalkylene oxide, the initiator used being dibenzoyl peroxide, dilauroyl peroxide or diacetyl peroxide. In the examples of these documents, the procedure is to prepare a solution from all reactants. This solution is either heated directly to the polymerization temperature or only a portion is initially charged and heated or the majority is metered in. In the first variant, it is also possible for larger amounts of solvent such a methyl acetate or methanol to be present (100% or 72% based on the amount of polyalkylene glycol and vinyl ester). Further procedures are merely mentioned in GB-B-922 457 but not used in the examples for preparing the graft polymers.

According to EP-A-219 048 and EP-285 037, graft polymers based on polyalkylene oxides and vinyl esters are suitable as graying inhibitors in the washing and after treatment of textiles comprising synthetic fibers. For this purpose, EP-A-285 935 and EP-285 038 also recommend graft polymers which comprise methyl acrylate or N-vinylpyrrolidone in copolymerized form as an additional graft monomer. For the preparation of the graft polymers used in the examples, no specific data are given and reference is made merely in general terms to DE-B-1 077 430 and GB-B-922 457.

The document WO 2009/013202 A1 describes a process for preparing copolymers in solid form wherein the copolymers are obtained by free-radically initiated polymerization of a mixture of 30 to 80% by weight of N-vinyllactam, 10 to 50% by weight of the vinyl acetate and 10 to 50% by weight of a polyether, in the presence of at least one solvent, with the proviso that the sum is 100% by weight, characterized in that the solvents are removed from the polymerization mixture with the aid of an extruder.

The document WO 2007/138054 A1 relates to novel laundry detergents and cleaning compositions comprising new amphiphilic graft polymers based on water-soluble polyalkylene oxides (A) as a graft base and side chains formed by polymerization of a vinyl ester component (B), said polymers having an average of ≤1 graft site per 50 alkylene oxide units and mean molar masses $M_w$ of from 3,000 to 100,000 g/mol. The invention further relates to the use of these amphiphilic graft polymers as a soil detachment/promoting additive to laundry detergents and cleaning compositions.

The document DE 10 2006 055 473 A1 describes a process for the preparation of graft polymers on the basis of polyethers and vinyl esters by conversion of polyethers, vinyl ester and further hydrophobic monomers in the presence of an organic solvent and a radical forming polymerization initiator under reflux conditions.

The document WO 2011/054789 A1 relates to a method for producing aqueous solutions of homo or copolymers of acrylic acid by means of radical polymerization of acrylic acid and optional water-soluble, monoethylene unsaturated comonomers in an aqueous medium in the presence of at least one water-soluble initiator and at least one water-soluble regulator, wherein the polymerization is performed by means of a continuous process, and wherein low-molecular components are at least partially separated out of the aqueous polymer solution obtained after polymerization. Microstructured mixers and reactors are preferably used for the polymerization. At least one reactor and/or mixer having microstructures are preferably used for the process.

The document DE 102 45 858 A1 describes the use of water-soluble or water-dispersible, film building graft polymers which are obtainable by a radical polymerization of a vinyl ester of an aliphatic $C_1$ to $C_{24}$ carbonic acid in the presence of polyether with the mean molecular weight of at least 300 g/mol.

The document WO 2009/133186 A1 relates to a method for the continuous production of a polymer by radical polymerization, wherein at least three materials are mixed with microstructures in one or more mixers and are then polymerized in at least one reaction zone.

The document DE 198 14 739 A1 describes the use of polyalkylene oxide based graft polymers as solubilizer. The graft polymers are obtainable by grafting of
a) polyalkylene oxide with
b) at least one monomer, selected from the group
   $b_1$) $C_1$-$C_{30}$-alkylesters of monoethylenic unsaturated $C_3$-$C_8$-carboxylic acids;
   $b_2$) vinyl esters of aliphatic $C_1$-$C_{30}$-carboxylic acids;
   $b_3$) $C_1$-$C_{30}$-alkylvinylethers;
   $b_4$) N—$C_1$-$C_{12}$-alkyl-substituted amides of monoethylenic unsaturated $C_3$-$C_8$-carboxylic acids
   $b_5$) N,N—$C_1$-$C_{12}$-dialkyl substituted amides of monoethylenic unsaturated $C_3$-$C_8$-carboxylic acids as solubilizer.

The document WO 2007/138053 A1 describes novel amphiphilic graft polymers based on water-soluble polyalkylene oxides (A) as a graft base and side chains formed by polymerization of a vinyl ester component (B), said polymers having an average of graft site per 50 alkylene oxide units and mean molar masses $M_w$ of from 3,000 to 100,000 g/mol. The inventive process describes the semi batch process whereby the used reactor is preferably a stirred tank.

Processes for the preparation of graft polymers based on polyalkylene oxides are limited by their process parameters, since heat removal represents a considerable security aspect. For this reason longer reaction times are required, usually several hours. Therefore amphiphilic graft polymers obtained in semi-batch processes, which are characterized by limited process parameters, are restricted in the structure variations. As a result the nature of the graft chains and their molecular weight distribution and their molecular weight distribution, which influence the structure and polarity of the graft polymers, are difficult to control.

It is an object of the present invention to provide a process for the preparation of amphiphilic graft polymers that permits reduced reaction times, a better space-time-yield and more flexible choice of the process parameters. In addition to this it is an object of the invention to provide amphiphilic graft polymers with a wider polarity distribution and the use of these polymers.

These objects are achieved by a continuous process for the preparation of amphiphilic graft polymers, wherein a vinyl ester component (B) composed of vinyl acetate and/or vinyl propionate (B1) and, if desired, a further ethylenically unsaturated monomer (B2), is polymerized in the presence of a polyalkylene oxide (A), a free radical-forming initiator (C) and, if desired, an additive (D), at a mean polymerization temperature at which the initiator (C) has a decomposition half-time of from 1 to 500 min, in at least one tubular reactor segment with a feed side and an outlet side, through which the reaction mixture comprising at least a part of component (A) to (C), and if desired (D), streams.

A BRIEF DESCRIPTION OF THE FIGURES

Figure 2:
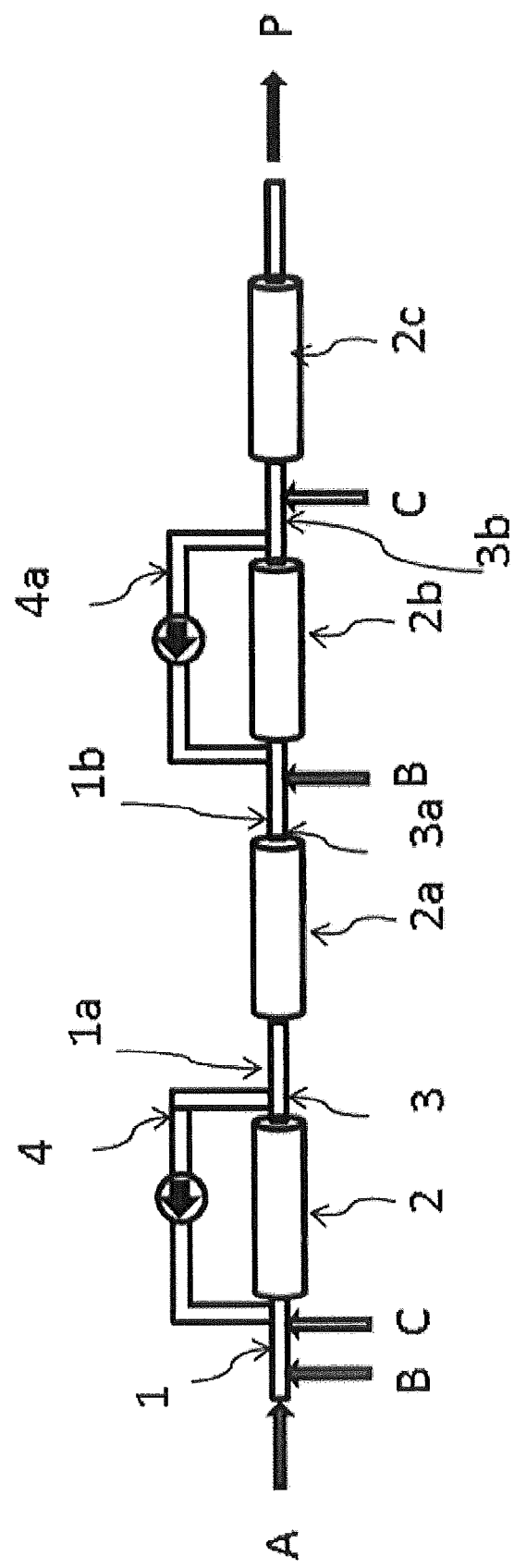
Figure 3:
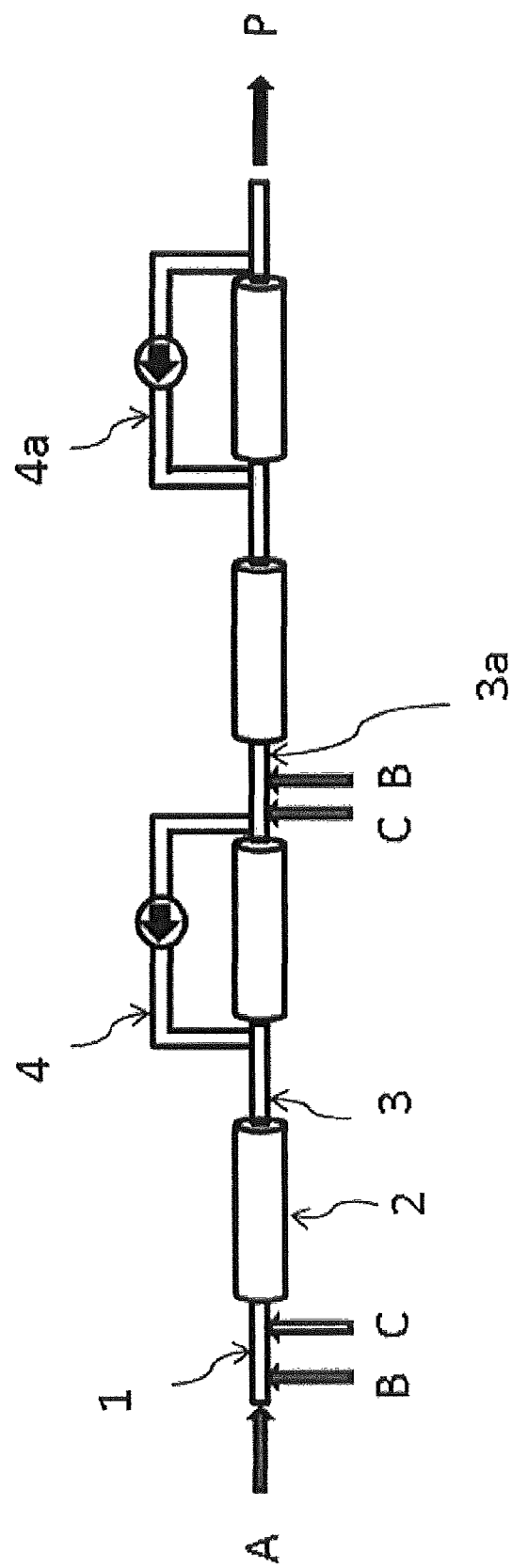
Figure 4:
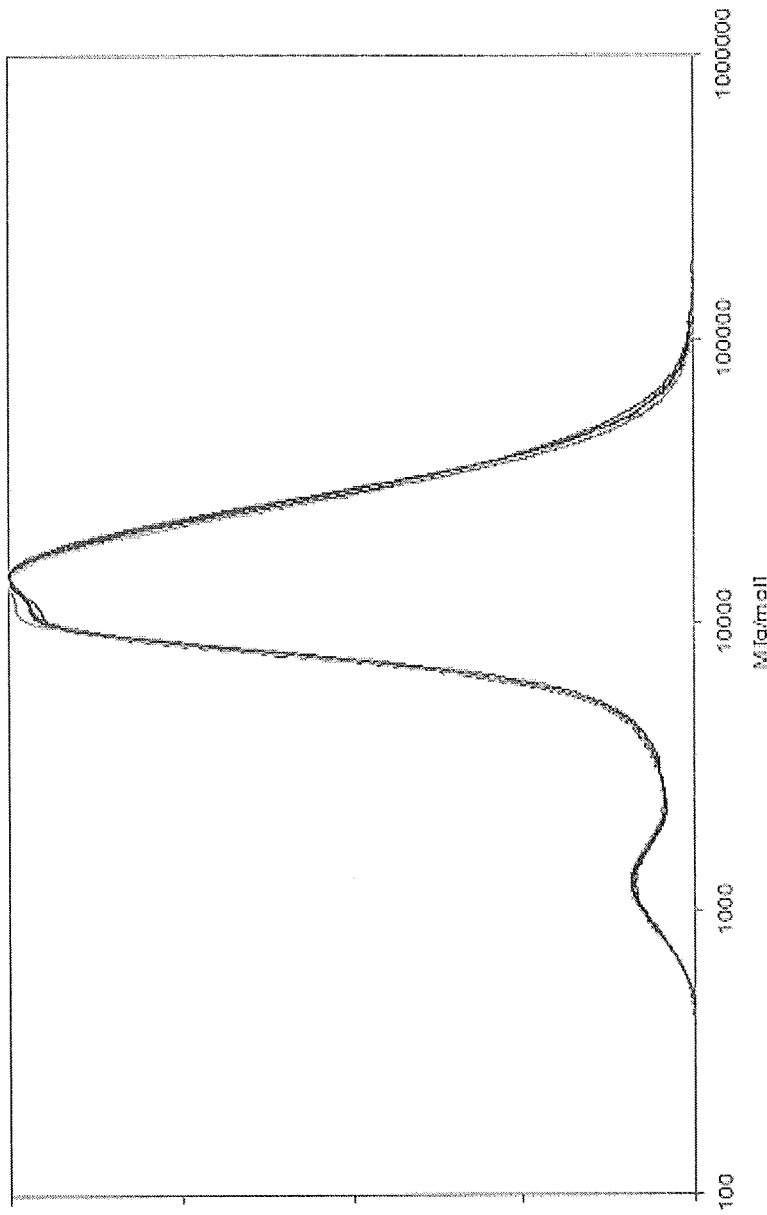
Figure 5:
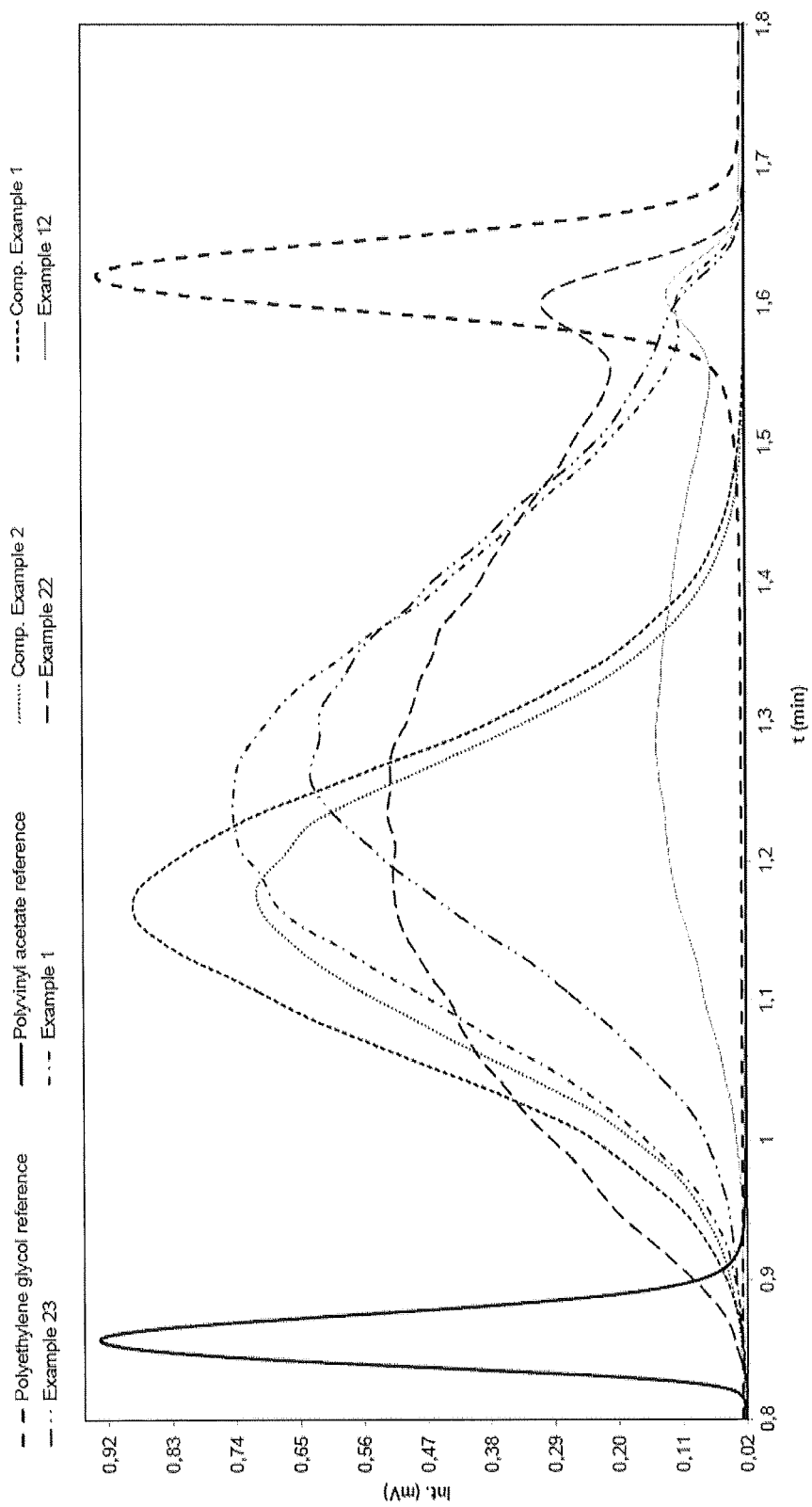
Figure 6:
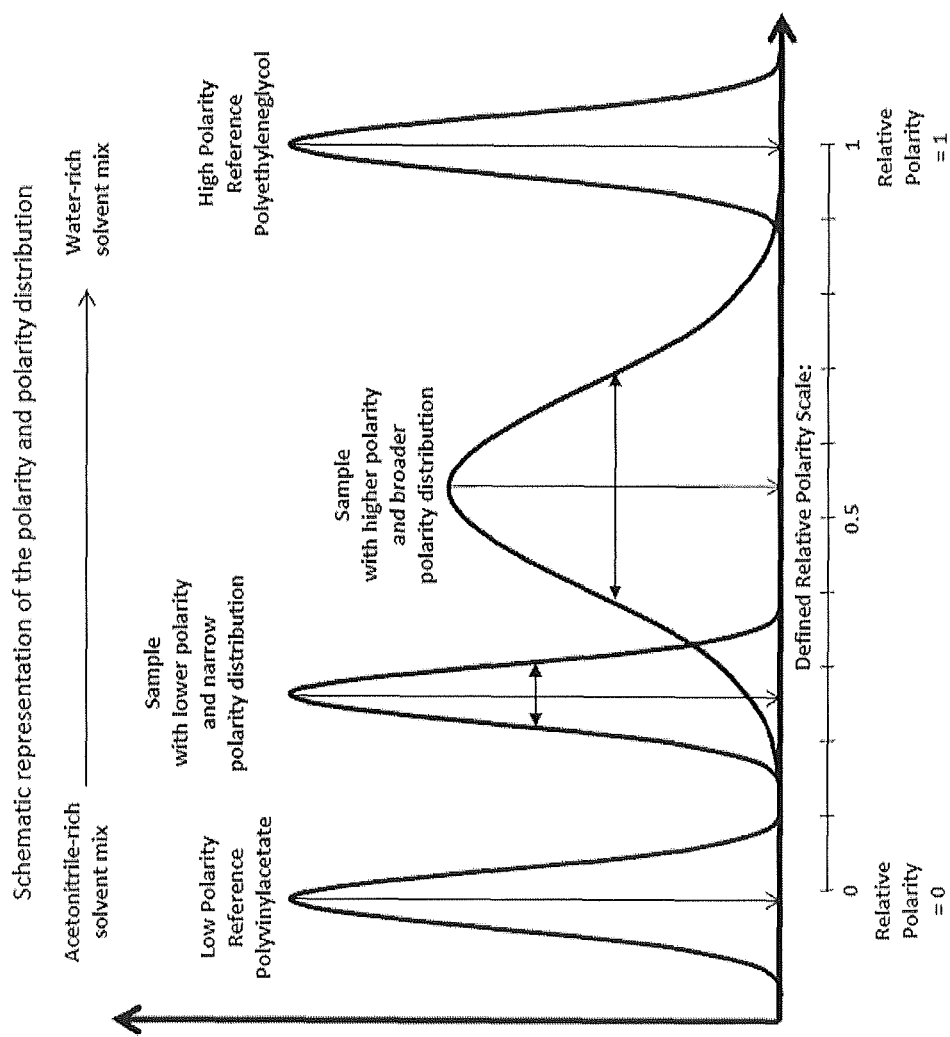
Figure 7:
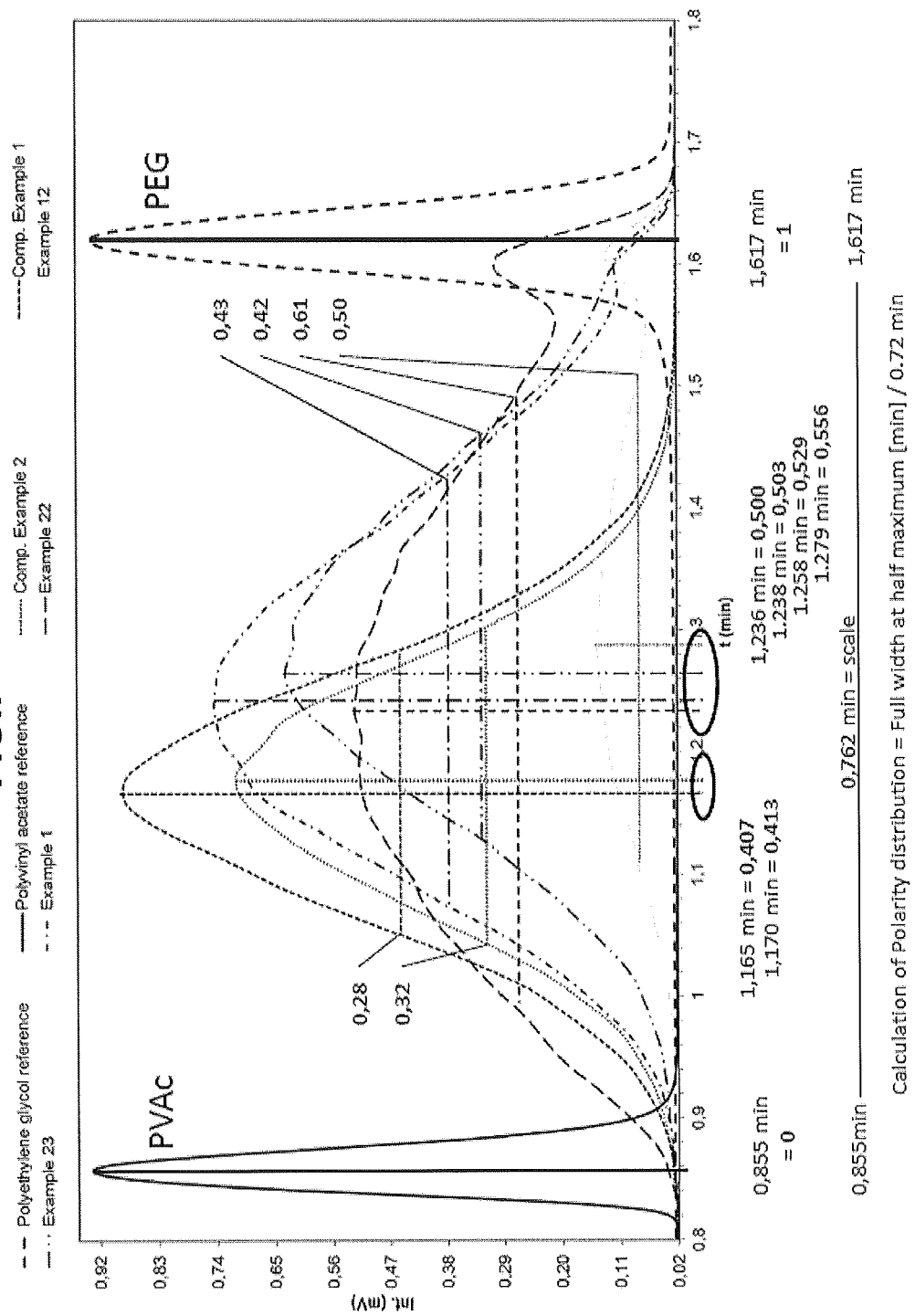
Figure 8:
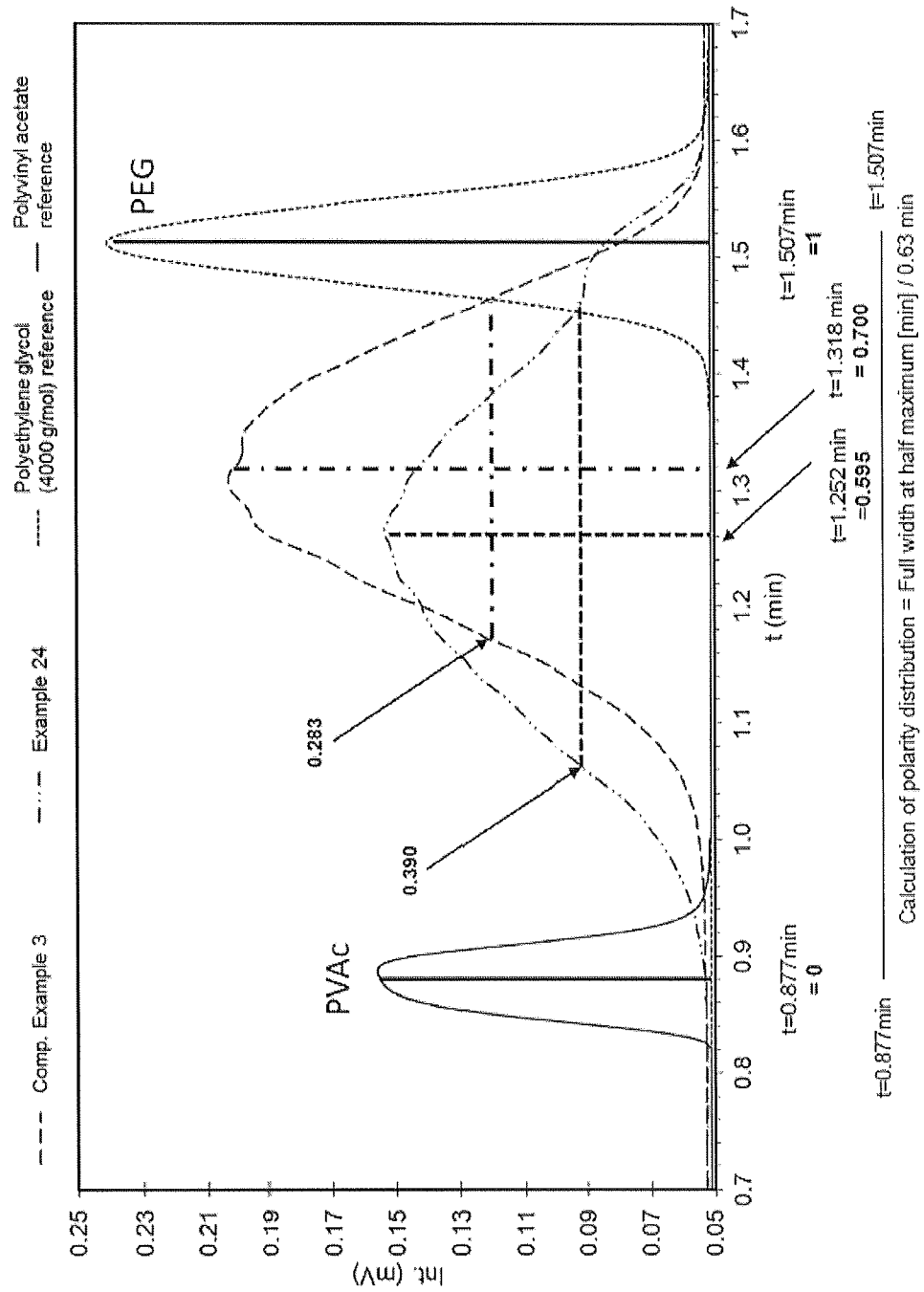
Figure 9:
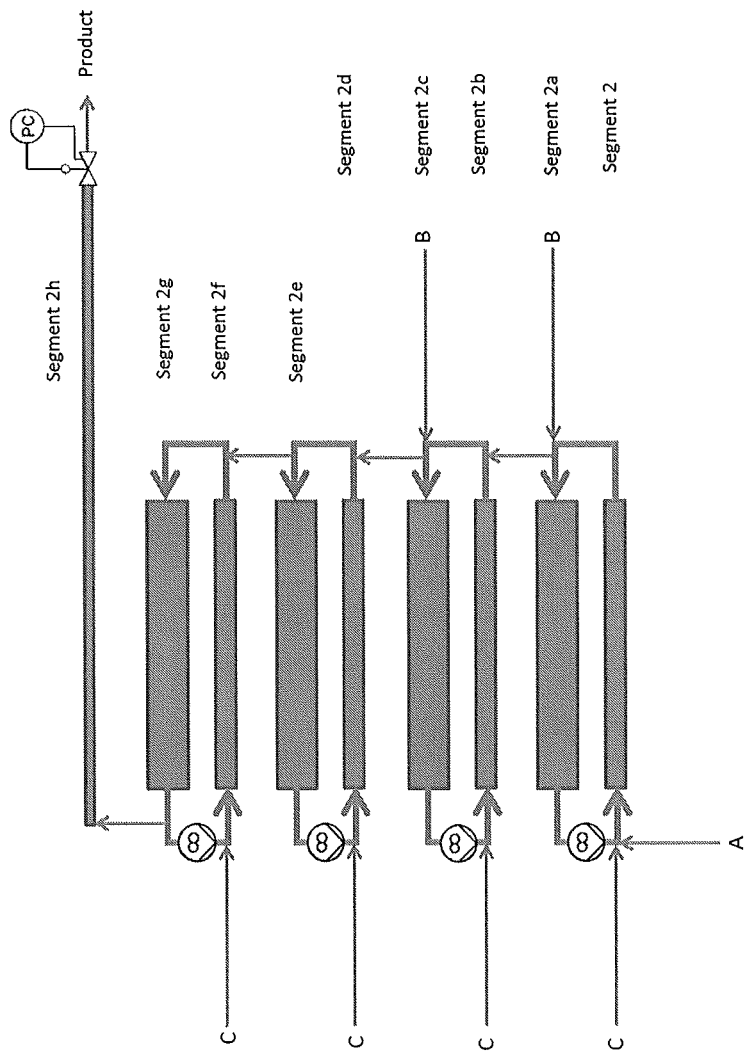
Figure 10:
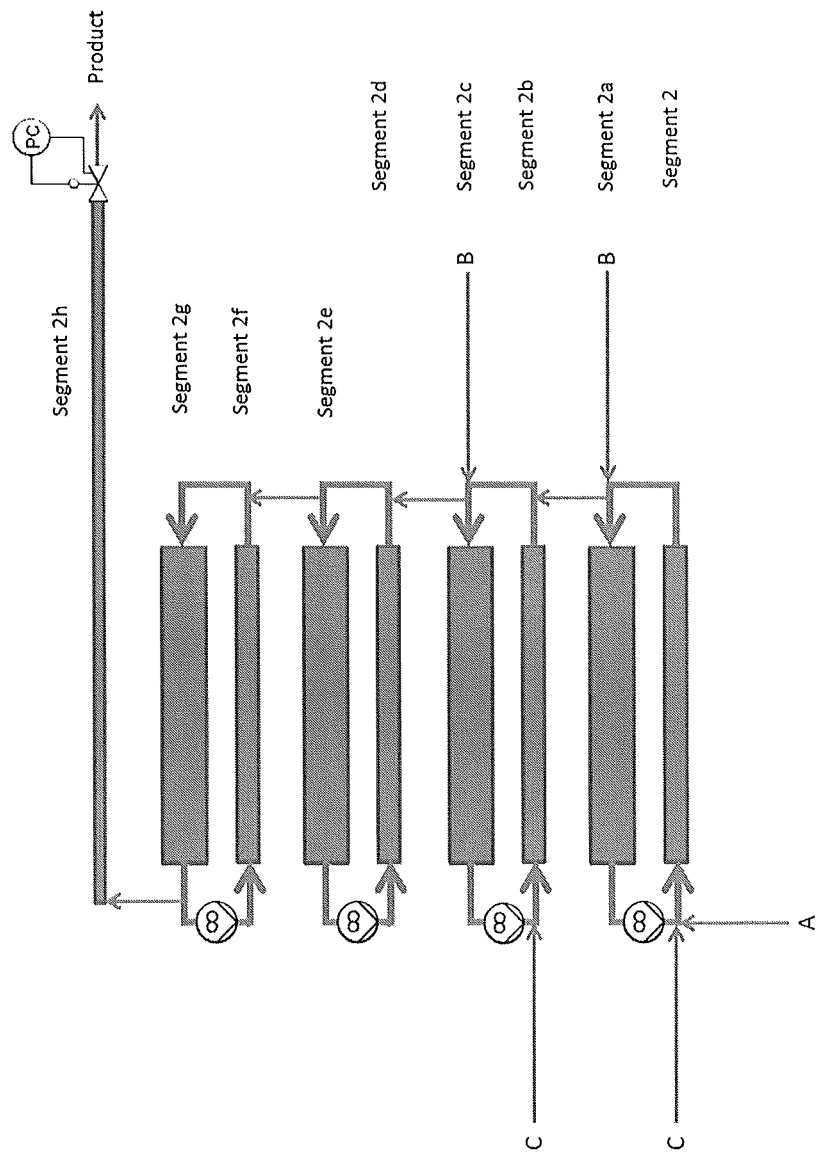

FIGS. 1 through 3 show exemplary embodiments of the process according to the invention.
FIG. 4 shows a molecular weight distribution determined by size exclusion chromatography.
FIG. 5 shows a GPEC chromatogram.
FIG. 6 shows a schematic representation of the polarity and the polarity distribution.
FIGS. 7 and 8 show calculations of polarity distribution.
FIGS. 9 and 10 show exemplary embodiments of the process according to the invention.

DETAILED DESCRIPTION OF THE INVENTION

Preferably, the inventive continuous process for the preparation in a tubular reactor of amphiphilic graft polymers is characterized by a rise in the space-time yield, in particular 2-50 times. Also the preparation of the inventive amphiphilic graft polymers consumes less space, because the tubular reactor is smaller than the processes run in semi-batch variations and there is no foaming issue as they can be run hydraulically filled. Hydraulically filled can be understood in the sense of the present invention that the reactor is completely filled with liquid and thus a gas phase is avoided. Since in the inventive process no gas phase occurs, no condensation of monomer can take place during the process. Therefore a homogenous mixture can be obtained in this continuous process. In addition to this, the temperature and the pressure can be raised in comparison to semi-batch processes.

The polyalkylene oxide is preferably water-soluble, wherein water-soluble in the sense of the present invention means a polyalkylene oxide of which at least 50% by weight is soluble in water.

In the sense of the present invention a polyalkylene oxide can be referred to as polyethylene glycol.

In the sense of the present invention a stream can be understood as a compound in liquid form, whereby the component is moved under force. This movement can be carried out, for example by a pump. The stream can also be a mixture of compounds, in particular with solvents.

In a further embodiment of the present invention, the mean polymerization temperature is the temperature, at which the initiator (C) has a decomposition half-time from 1 to 400 min, preferably from 2 to 300 min and particular from 3 to 150 min.

In a further embodiment of the present invention, the tubular reactor segment can also be filled with Raschig rings.

In a preferred embodiment of the continuous process the polymerization takes place in at least two tubular reactor segments connected in series. The polymerization process according to the present invention can be carried out in various types of tubular reactor segments, for example of a different type or length. In one embodiment two tubular reactor segments are connected in series and one tubular reactor segment is connected in parallel to them.

Preferably in the tubular reactor segment the stream of the reaction mixture is held at a mean polymerization temperature T1 at which the initiator (C) has a decomposition half-time from 1 to 500 min and at least one of the components (A), (B), (C) or (D) is metered in the feed side at a temperature T2 at which the initiator (C) has a decomposition half-time above 500 min.

In a preferred embodiment of the continuous process at least two tubular segments are connected in series, wherein the first tubular reactor segment has a first feed side and a first outlet side, wherein the first tubular reactor segment is connected to the second tubular reactor segment via the first outlet side that corresponds to the second feed side of the second tubular segment and whereby at least one recycle stream is removed from the outlet side of at least one tubular reactor segment and recycled to the inlet side of one of the tubular reactor segments. For example, tubular reactor segments can be connected in series, whereby one recycle stream is removed from the outlet side of the second tubular reactor segment and recycled to the feed side of the first or the second tubular reactor segment. In a further embodiment, two tubular reactor segments can be connected in series, whereby one recycle stream is removed from the outlet side of the first tubular reactor segment and recycled to the feed side of first tubular reactor segment. In the sense of the present invention one recycle stream can be understood as one loop.

In a preferred embodiment of the continuous process the ratio of the recycle stream to the feed stream is between 1 and 1000, preferably by weight. Preferably, the ratio is between 2 and 200, in particular between 3 and 100 and especially preferred between 10 and 50. The feed stream is the stream, where the recycle stream enters.

In a preferred embodiment of the continuous process 90-100% of the total amount of component (A) is introduced in the first feed side, 0-60% of the total amount of component (B) is introduced in the first feed side, 10-60% of the total amount of component (C) is introduced in the first feed side, if desired, 0-100% of the total amount of component (D) is introduced in the first feed side, whereby the remaining amount of the components (A) to (D) is introduced after the first tubular reactor segment in at least one outlet or inlet side of a subsequent tubular reactor segment. The total amounts of the components correspond to the whole amount that is fed into the continuous process without including the amount of the recycle stream. The remaining amount of each component can also be supplied in various fractions into the feed sides after the first tubular reactor segment.

Preferably 100% of the total amount of component (A) is introduced in the first feed side, 5-60% of the total amount of component (B) is introduced in the first feed side, 10-60% of the total amount of component (C) is introduced in the first feed side, if desired, 20-100% of the total amount of component (D) is introduced in the first feed side, whereby the remaining amount of the components (A) to (D) is introduced after the first tubular reactor segment in at least one outlet or inlet side of a subsequent tubular reactor segment, and more preferably 100% of the total amount of component (A) is introduced in the first feed side, 20-40% of the total amount of component (B) is introduced in the first feed side, 10-50% of the total amount of component (C) is introduced in the first feed side, if desired, 90-100% of the total amount of component (D) is introduced in the first feed side, whereby the remaining amount of the components (A) to (D) is introduced after the first tubular reactor segment in at least one outlet or inlet side of a subsequent tubular reactor segment.

In a preferred embodiment of the continuous process 15 to 85% by weight of a vinyl ester component (B), composed of 70 to 100% by weight of vinyl acetate and/or vinyl propionate (B1) and 0 to 30% by weight of the further ethylenically unsaturated monomer (B2), 15 to 70% by weight of the polyalkylene oxide (A) of mean molecular mass $M_n$ of from 1000 to 20000 g/mol, 0.1 to 3% by weight, based on compound (B), of the free radical-forming initiator (C) and 0 to 40% by weight, based on the sum of the components (A), (B) and (C), of an additive (D), are used, whereby the sum of which is in total 100%.

In particular 20 to 70%, by weight of the vinyl ester component (B), 25 to 60% by weight of a water-soluble polyalkylene oxide (A) of mean molecular mass $M_n$ of from 1000 to 20,000 g/mol, 0.2 to 2.5% by weight based on component (B), of the free-radical forming initiator (C) and 0 to 30% by weight, based on the sum of the components (A), (B) and (C) of an additive, are used, whereby the sum of which is in total 100%.

Graft polymers of polyvinylacetate (PVAc) grafted on polyethylenglycol (PEG) are amphipilic polymers with a polarity depending mainly on the ratio of polyethylenglycol as the hydrophilic part and polyvinylacetaet as the hydrophobic part and their amount of individual grafted polymer chains. Higher amounts of vinylaceate in the polymers renders the polymer more apolar, whereas increasing the amount of PEG renders the polymer more polar. This can be controlled by the ratio of PEG and VAc in the polymerization reaction. The distribution of polarity can be assessed by GPEC (gradient polymer elution chromatography). Whereas the polymers prepared according to the state of the art exhibit a narrow polarity distribution, described as a relative to PEG and PVAc as a standard, polymers with the same Polyethylenglycol/Vinylacetat (PEG/VAc) weight ratio that are prepared by the inventive process exhibit a broad distribution of polarity. Furthermore, whereas polymers prepared according to the state of the art exhibit a low polarity, described as µ relative to PEG and PVAc as a standard, polymers with the same PEGNAc weight ratio that are prepared by the inventive process exhibit a higher polarity, i.e. they are in total more hydrophilic. A broad distribution of polarity can be advantageous especially when polymers are used as dispersants, emulsifiers or solubilizers of multicomponent mixtures, because for each of the components, a polymer with the matching polarity is present in a polymer with broad polarity distribution.

Water-soluble polyalkylene oxides suitable for forming the graft base (A) are in principle all polymers based on $C_2$-$C_4$-alkylene oxides which comprise at least 30% by weight.

In another embodiment the polyalkylene oxides (A) preferably have a low polydispersity $M_w/M_n$, whereas $M_w$ refers to the weight average molecular weight and $M_n$ refers to the number average molecular weight. Their polydispersity is preferably <2.5.

The polyalkylene oxides (A) may be the corresponding polyalkylene glycols in free form, i.e. with OH end groups, but they may also be capped at one or both end groups. Suitable end groups are, for example, $C_1$-$C_{25}$-alkyl, phenyl and $C_1$-$C_{14}$-alkylphenyl groups.

Specific examples of particularly suitable polyalkylene oxides (A) include:
(A1) polyethylene glycols which may be capped at one or both end groups, especially by $C_1$-$C_{25}$-alkyl groups, but are preferably not etherified, and have mean molar masses $M_n$ of preferably from 1,500 to 20,000 g/mol, more preferably from 2,500 to 15,000 g/mol;
(A2) copolymers of ethylene oxide and propylene oxide and/or butylene oxide with an ethylene oxide content of at least 50% by weight, which may likewise be capped at one or both end groups, especially by $C_1$-$C_{25}$-alkyl groups, but are preferably not etherified, and have mean molar masses $M_n$ of preferably from 1,500 to 20,000 g/mol, more preferably from 2,500 to 15,000 g/mol;
(A3) chain-extended products having mean molar masses of in particular from 2,500 to 20,000 g/mol, which are obtainable by reacting polyethylene glycols (A1) having mean molar masses $M_n$ of from 200 to 5,000 g/mol or copolymers (A2) having mean molar masses $M_n$ of from 200 to 5,000 g/mol with $C_2$-$C_{12}$-dicarboxylic acids or -dicarboxylic esters or $C_6$-$C_{18}$-diisocyanates.

Preferred graft bases (A) are the polyethylene glycols (A1).

The side chains of the inventive graft polymers are formed by polymerization of a vinyl ester component (B) in the presence of the graft base (A).

The vinyl ester component (B) may consist advantageously of (B1) vinyl acetate or vinyl propionate or of mixtures of vinyl acetate and vinyl propionate, particular preference being given to vinyl acetate as the vinyl ester component (B).

However, the side chains of the graft polymer can also be formed by copolymerizing vinyl acetate and/or vinyl propionate (B1) and a further ethylenically unsaturated monomer (B2). The fraction of monomer (B2) in the vinyl ester component (B) may be up to 30% by weight, which corresponds to a content in the graft polymer of (B2) of 24% by weight.

Suitable comonomers (B2) are, for example, monoethylenically unsaturated carboxylic acids and dicarboxylic acids and their derivatives, such as esters, amides and anhydrides, and styrene. It is of course also possible to use mixtures of different comonomers.

For the purpose of this invention the prefix (meth) written before a compound means the respective unsubstituted compound and/or the compound substituted by the methyl group. For instance, "(meth)acrylic acid" means acrylic acid and/or methacrylic acid, (meth)acrylate means acrylate and/or methacrylate, (meth)acrylamide means acrylamide and/or methacrylamide.

Specific examples include: (meth)acrylic acid, $C_1$-$C_{12}$-alkyl and hydroxy-$C_2$-$C_{12}$-alkyl esters of (meth)acrylic acid, (meth)acrylamide, N—$C_1$-$C_{12}$-alkyl(meth)acrylamide, whereby the alkyl moiety can be branched or linear.

N,N-di($C_1$-$C_6$-alkyl)(meth)acrylamide, maleic acid, maleic anhydride and mono($C_1$-$C_{12}$-alkyl)esters of maleic acid. Preferred monomers (B2) are the $C_1$-$C_6$-alkyl esters of (meth)acrylic acid and hydroxyethyl acrylate, particular preference being given to the $C_1$-$C_4$-alkyl esters of (meth)acrylic acid.

Very particularly preferred monomers (B2) are methyl acrylate, ethyl acrylate and in particular n-butyl acrylate.

When the inventive graft polymers comprise the monomers (B2) as a constituent of the vinyl ester component (B), the content of graft polymers in (B2) is preferably from 0.5 to 24% by weight, more preferably from 1 to 15% by weight and most preferably from 2 to 10% by weight.

Preferably in the process according to the invention the local steady-state concentration of radicals present at the mean polymerization temperature is substantially constant over time and the graft monomer (B) is present in the reaction mixture or the stream constantly in low concentration (for example of not more than 5% by weight). This allows the reaction to be controlled, and graft polymers can be prepared in a controlled manner with the desired low degree of grafting and the desired low polydispersity. The term "mean polymerization temperature" is intended to mean here that, although the process is substantially isothermal, there may, owing to the exothermicity of the reaction, be temperature variations which are preferably kept within the range of +/−10° C., more preferably in the range of +/−5° C.

In another form the process can be run adiabatically where the heat of polymerization is used to heat the reaction mixture to a desired reaction temperature.

According to the invention, the free radical-forming initiator (C) at the mean polymerization temperature should have a decomposition half-life of from 2 to 500 min, preferably from 6 to 300 min and more preferably from 8 to 150 min.

Preferably the mean polymerization temperature is appropriately in the range from 50 to 160° C., in particular from 60 to 140° C. and especially from 65 to 110° C.

Examples of suitable initiators (C) whose decomposition half-life in the temperature range from 50 to 160° C. is from 2 to 500 min are:

Tert-$C_4$-$C_{12}$ hydroperoxides, such as cumyl hydroperoxide, tert-amyl hydroperoxide, tert-butyl hydroperoxide, 2,5-dimethyl-2,5-di-(hydroperoxy)-hexan and 1,1,3,3-tetramethylbutyl hydroperoxide.

$C_4$-$C_{12}$ dialkyl peroxides, such as dicumyl peroxide, 2,5-di(tert-butylperoxy)-2,5-dimethylhexane, tert-butyl cumyl peroxide, alfa, alfa-bis(tert-butylperoxy)diisopropylbenzene, di(tert-amyl)peroxide, di(tert-butyl) peroxide, 2,5-di(tert-butylperoxy)-2,5-dimethyl-3-hexyne, $C_4$-$C_{12}$ ketone peroxides, such as methyl ethyl ketone peroxide, methyl isopropyl ketone peroxide, cyclohexanone peroxide, acetylacetone peroxide and methyl isobutyl ketone peroxide.

C4-C12 diperoxyketals, such as butyl 4,4-di(tert-butylperoxy)valerate, 1,1-di(tert-butylperoxy)cyclohexane, ethyl 3,3-di(tert-amylperoxy) butanoate, tert-butyl peroxy-2-ethylhexanoate, ethyl 3,3-di(tert-butylperoxy) butyrate, 1,1-di(tert-butylperoxy)-cyclohexane, 1,2-di(tert-butylperoxy)-3,3,5-trimethylcyclohexane and 2,2-di(tert-butylperoxy)butane O—$C_2$-$C_{12}$-acylated derivatives of tert-$C_4$-$C_{12}$-alkyl hydroperoxides and tert-($C_6$-$C_{12}$-aralkyl)hydroperoxides, such as tert-amyl peroxyacetate, tert-butyl peroxyacetate, tert-butyl monoperoxy-maleate, tert-butyl peroxyisobutyrate, tert-butyl peroxypivalate, tert-butyl peroxyneoheptanoate, tert-butyl peroxy-2-ethylhexanoate, tert-butyl peroxy-3,5,5-trimethylhexanoate, tert-butyl peroxyneodecanoate, tert-amyl peroxypivalate, tert-amyl peroxy-2-ethylhexanoate, tert-amyl peroxyneodecanoate, 1,1,3,3-tetramethylbutyl peroxyneodecanoate, cumyl peroxyneodecanoate, 3-hydroxy-1,1-dimethylbutyl peroxyneodecanoate, tert-butyl peroxybenzoate, 2,5-di(2-ethylhexanoylperoxy)-2,5-dimethylhexane, tert-amyl peroxybenzoate and di-tert-butyl diperoxyphthalate;

di-O—$C_4$-$C_{12}$-acylated derivatives of tert-$C_8$-$C_{10}$-alkylene bisperoxides, such as 2,5-dimethyl-2,5-di(2-ethyl-hexanoylperoxy)hexane, 2,5-dimethyl-2,5-di(benzoylperoxy)hexane and 1,3-di(2-neodecanoylperoxyisopropyl)benzene; di($C_2$-$C_{12}$-alkanoyl) and dibenzoyl peroxides, such as diacetyl peroxide, dipropionyl peroxide, disuccinic acid peroxide, dicapryloyl peroxide, di(3,5,5-trimethylhexanoyl) peroxide, didecanoyl peroxide, dilauroyl peroxide, dibenzoyl peroxide, di(4-methylbenzoyl)peroxide, di(4-chlorobenzoyl)peroxide and di(2,4-dichlorobenzoyl)peroxide;

tert-$C_4$-$C_5$-alkyl peroxy($C_4$-$C_{12}$-alkyl)carbonates, such as tert-amyl per-oxy(2-ethylhexyl)carbonate, tert-butyl peroxy (isopropyl)carbonate and tert-butyl peroxy(2-ethylhexyl)carbonate and polyether polytert-butyl peroxy carbonate; di($C_2$-$C_{12}$-alkyl)peroxydicarbonates, such as di(n-propyl)peroxydicarbonate, di(n-butyl)peroxydicarbonate, di(sec-butyl)peroxydicarbonate and di(2-ethylhexyl)peroxydicarbonate azo compounds such as 2,2'-azobisisobutyronitrile (AIBN), 2,2'-azobis(2-methylbutyronitrile), 2,2'-azobis[2-methyl-N-(2-hydroxyethyl)propionamide], 1,1'-azobis(1-cyclohexanecarbonitrile), 2,2'-azobis(2,4-dimethylvaleronitrile), 2,2'-azobis(N,N'-dimethylenisobutyroamidine), 2,2'-azobis-(N,N'-dimethyleneisobutyroamidine), 2,2'-azobis(2-methylpropioamidine), N-(3-hydroxy-1,1-bis (hydroxymethyl)propyl)-2-[1-(3-hydroxy-1,1-bis-(hydroxymethyl)propylcarbamoyl)-1-methylethylazo]-2-methylpropionamide and N-(1-ethyl-3-hydroxypropyl)-2-[1-(1-ethyl-3-hydroxypropylcarbamoyl)-1-methyl-ethylazo]-2-methylpropionamide; 2,2'-azobis(2-cyano-2-butane), dimethyl-2,2'-azobisdimethyl isobutyrate, 4,4'-azobis (4-cyanopentanoic acid), 1,1'-azobis(cyclohexanecarbanitrile), 2-(tert-butylazo)-2-cyanopropane, 2,2'-azobis[2-methyl-N-(1,1)-bis(hydroxymethyl)-2-hydroxyethyl]propionamide, 2,2'-azobis[2-methyl-N-hydroxyethyl)]propionamide, 2,2'-azobis(N,N'-dimethylene-isobutyramidine)dihydrochloride, 2,2'-azobis(2-amidinopropane)dihydrochloride, 2,2'-azobis (N,N'-dimethyleneisobutyramine), 2,2'-azobis(2-methyl-N-[1,1-bis(hydroxymethyl)-2-hydroxyethyl] propionamide), 2,2'-azobis(2-methyl-N-[1,1-bis (hydroxymethyl)ethyl]propionamide), 2,2'-azobis[2-methyl-N-(2-hydroxyethyl)propionamide], 2,2'-azobis (isobutyramide)dihydrate, 2,2'-azobis(2,2,4-trimethylpentane), 2,2'-azobis(2-methylpropane)

redox initiators: this is understood to mean initiator systems which comprise an oxidizing agent, for example a salt of peroxodisulfuric acid, hydrogen peroxide or an organic peroxide such as tert-butyl hydroperoxide, and a reducing agent. As the reducing agent, they preferably comprise a sulfur compound which is especially selected from sodium hydrogensulfite, sodium hydroxymethanesulfinate and the hydrogensulfite adduct to acetone. Further suitable reducing agents are nitrogen and phosphorus compounds such as phosphorous acid, hypophosphites and phosphinates, di-tert-butyl hyponitrite and dicumyl hyponitrite, and also hydrazine and hydrazine hydrate and ascorbic acid. In addition, redox initiator systems may comprise an addition of small amounts of redox metal salts such as iron salts, vanadium salts, copper salts, chromium salts or manganese salts, for example the ascorbic acid/iron(II) sulfate/sodium peroxodisulfate redox initiator system.

The abovementioned initiators can also be used in any combinations. The initiators can be used as such or dissolved in a solvent. Preference is given to using the initiators dissolved in a suitable solvent.

Depending on the mean polymerization temperature, examples of particularly suitable initiators (C) are:

- at a mean polymerization temperature of from 50 to 60° C.: tert-butyl peroxyneoheptanoate, tert-butyl peroxyneodecanoate, tert-amyl peroxypivalate, tert-amyl peroxyneodecanoate, 1,1,3,3-tetramethylbutyl peroxyneodecanoate, cumyl peroxyneodecanoate, 1,3-di(2-neodecanoyl peroxyisopropy/)benzene, di(n-butyl) peroxydicarbonate and di(2-ethylhexyl) peroxydicarbonate;
- at a mean polymerization temperature of from 60 to 70° C.: tert-butyl peroxypivalate, tert-butyl peroxyneoheptanoate, tert-butyl peroxyneodecanoate, tert-amyl peroxypivalate and di(2,4-dichlorobenzoyl) peroxide;
- at a mean polymerization temperature of from 70 to 80° C.: tert-butyl peroxypivalate, tert-butyl peroxyneoheptanoate, tert-amyl peroxypivalate, dipropionyl peroxide, dicapryloyl peroxide, didecanoyl peroxide, dilauroyl peroxide, di(2,4-dichlorobenzoyl)peroxide and 2,5-dimethyl[-2,5-di(2-ethylhexanoylperoxy)hexane;
- at a mean polymerization temperature of from 80 to 90° C.: tert-butyl peroxyisobutyrate, tert-butyl peroxy-2-ethylhexanoate, tert-amyl peroxy-2-ethylhexanoate, dipropionyl peroxide, dicapryloyl peroxide, didecanoyl peroxide, dilauroyl peroxide, di(3,5,5-trimethylhexanoyl) peroxide, dibenzoyl peroxide and di(4-methylbenzoyl) peroxide;
- at a mean polymerization temperature of from 90 to 100° C.: tert-butyl peroxyisobutyrate, tert-butyl peroxy-2-ethylhexanoate, tert-butyl monoperoxymaleate, tert-amyl peroxy-2-ethylhexanoate, dibenzoyl peroxide and di(4-methylbenzoyl)peroxide;
- at a mean polymerization temperature of from 100 to 110° C.: tert-butyl monoperoxymaleate, tert-butyl peroxyisobutyrate and tert-amyl peroxy(2-ethylhexyl)carbonate;
- at a mean polymerization temperature of from 110 to 120° C.: tert-butyl monoperoxymaleate, tert-butyl peroxy-3,5,5-trimethylhexanoate and tert-amyl peroxy(2-ethylhexyl)carbonate.
- at a mean polymerization temperature from 135 to 165° C.: 2,5-dimethyl-2,5-di(tert-butylperoxy)hexyne-3, di-tert-butyl peroxide, 3,6,9-triethyl-3,6,9-trimethyl-1,4,7-triperoxane, isopropylcumyl hydroperoxide, α,α-bis (tert-butylperoxy)diisopropylbenzene, 1,1,3,3-tetramethylbutyl hydroperoxide, acetylacetone peroxide
- at a mean polymerization temperature from 180 to 195° C.: 2,5-dimethyl-2,5-di-(hydroperoxy)-hexane, cumyl hydroperoxide, tert-amyl hydroperoxide, tert-butyl hydroperoxide.

Preferred initiators (C) are O—$C_4$-$C_{12}$-acylated derivatives of tert-$C_4$-$C_5$-alkyl hydroperoxides, tert-Butyl hydroperoxide or di-tert-Butyl hydroperoxides, particular preference being given to tert-butyl peroxypivalate and tert-butyl peroxy-2-ethylhexanoate.

Further preferred initiators that are especially suited for temperatures above 120° C. are tert-butyl peroxybenzoate, di-cumylperoxid, di-tert-butyl peroxide, especially preferred di-tert-butyl peroxide.

Particularly advantageous polymerization conditions can be established effortlessly by precise adjustment of initiator (C) and polymerization temperature. For instance, the preferred mean polymerization temperature in the case of use of tert-butyl peroxypivalate is from 60 to 80° C., and, in the case of tert-butyl peroxy-2-ethylhexanoate, from 80 to 100° C.

The inventive polymerization reaction can be carried out in the presence of an additive (D). The additive is selected from the group consisting of surfactants, solvents, diluents, fillers, colorants, rheology modifiers, crosslinkers or emulsifiers or mixtures thereof.

When present, the surfactant preferably is selected from the groups of non-ionic, cationic or anionic surfactants.

The anionic surfactants characterized by carboxylate, sulfonate, sulfate, or phosphate solubilizing groups, and non-ionic surfactants characterized by amide or hydroxyl groups or ethylene oxide chains.

Cationic, amphoteric or zwitterionic surfactants may also or alternatively be used provided that they are compatible with the copolymer and other ingredients of the composition in the quantity required by the invention.

Cationic surfactants characterized by amine or ammonium solubilizing groups, and/or amphoteric surfactants characterized by combinations of anionic and cationic solubilizing groups may be selected.

Preferred surfactants for use in the practice of the invention may be selected from the $C_8$ to $C_{18}$ fatty acids or their water soluble salts; water soluble sulfates of $C_8$ to $C_{18}$ alcohols; sulfonated alkylaryl compounds such as, for example, dodecylbenzene sulfonate, alkylphenoxy polyethoxy ethanols, such as, for example with $C_7$ to $C_{18}$ alkyl groups and 9 to 40 or more oxyethylene units; ethylene oxide derivatives of long chain carboxylic acids, such as, for example of lauric, myristic, palmitic or oleic acids; ethylene oxide derivatives of long chain alcohols, such as, for example of lauryl or cetyl alcohols; and alkanolamides and polyglucosides, such as, for example the alkyl polyglucosides. Suitable cationic surfactants may be, for example, lauryl pyridinium chloride, octylbenzyltrimethyl-ammonium chloride, dodecyl trimethylammonium chloride and ethylene oxide condensates of primary fatty acid amines.

Non-ionic surfactants are interfacially active substances having a head group, which is an uncharged, polar, hydrophilic group, not carrying a ionic charge at neutral pH, and which head group makes the non-ionic surfactant water soluble. Such a surfactant adsorbs at interfaces and aggregates to micelles above the critical micelle concentration (cmc). According to the type of the hydrophilic head group it can be distinguished between (oligo)oxyalkylene-groups, especially (oligo)oxyethylene-groups, (polyethyleneglycolgroups), including fatty alcohol polyglycole ether (fatty alcohol alkoxylates), alkylphenol polyglycolether and fatty acid ethoxylates, alkoxylated triglycerides and mixed ethers (polyethylene glycolether alcoxylated on both sides); and carbohydrate-groups, including e.g. alkyl polyglucosides and fatty acid-N-methylglucamides.

Particular preference is given here to alkoxylation products of $C_8$-$C_{16}$-alcohols with a high degree of branching, which allow the formulation of polymer mixtures which are free-flowing at 40-70° C. and have a low polymer content at comparatively low viscosity. The branching may be present in the alkyl chain of the alcohol and/or in the polyalkoxylate moiety (copolymerization of at least one propylene oxide, butylene oxide or isobutylene oxide unit). Particularly suitable examples of these alkoxylation products are 2-ethylhexanol or 2-propylheptanol alkoxylated with 1-15 mol of ethylene oxide, $C_{13}$/$C_{15}$ oxo alcohol or $C_{12}$/$C_{14}$ or $C_{16}$/$C_{16}$-is fatty alcohol alkoxylated with 1-15 mol of ethylene oxide and 1-3 mol of propylene oxide, preference being given to 2-propylheptanol alkoxylated with 1-15 mol of ethylene oxide and 1-3 mol of propylene oxide.

In particular additives are solvents, which are also used to formulate the inventive graft polymers for use and can therefore remain in the polymerization product.

Preference is given to using water-soluble or water-miscible solvents.

Examples of suitable solvents (D) include:

Monohydric alcohols, preferably aliphatic $C_1$-$C_{16}$-alcohols, more preferably aliphatic $C_2$-$C_{12}$-alcohols, most preferably $C_2$-$C_4$-alcohols, such as ethanol, propanol, iso-propanol, butanol, sec-butanol and tert-butanol; polyhydric alcohols, preferably $C_2$-$C_{10}$-diols, more preferably $C_2$-$C_6$-diols, most preferably $C_2$-$C_4$-alkylene glycols, such as ethylene glycol and propylene glycol; alkylene glycol ethers, preferably alkylene glycol mono($C_1$-$C_{12}$-alkyl)ethers and alkylene glycol di($C_1$-$C_6$-alkyl)ethers, more preferably alkylene glycol mono- and di($C_1$-$C_2$-alkyl)ethers, most preferably alkylene glycol mono($C_1$-$C_2$-alkyl)ethers, such as ethylene glycol monomethyl and -ethyl ether and propylene glycol mono- methyl and -ethyl ether; polyalkylene glycols, preferably poly($C_2$-$C_4$-alkylene)glycols having 2-20 $C_2$-$C_4$-alkylene glycol units, more preferably polyethylene glycols having 2-20 ethylene glycol units and polypropylene glycols having 2-10 propylene glycol units, most preferably polyethylene glycols having 2-15 ethylene glycol units and polypropylene glycols having 2-4 propylene glycol units, such as diethylene glycol, triethylene glycol, dipropylene glycol and tripropylene glycol; polyalkylene glycol monoethers, preferably poly($C_2$-$C_4$-alkylene)glycol mono($C_1$-$C_{25}$-alkyl)ethers having 2-20 alkylene glycol units, more preferably poly($C_2$-$C_4$-alkylene)glycol mono($C_1$-$C_{2o}$-alkyl) ethers having 2-20 alkylene glycol units, most preferably poly($C_2$-$C_3$-alkylene) glycol mono($C_1$-$C_{16}$-alkyl)ethers having 3-20 alkylene glycol units; carboxylic esters, preferably $C_1$-Cs-alkyl esters of $C_1$-$C_6$-carboxylic acids, more preferably $C_1$-$C_4$-alkyl esters of $C_1$-$C_3$-carboxylic acids, most preferably $C_2$-$C_4$-alkyl esters of $C_2$-$C_3$-carboxylic acids, such as ethyl acetate and ethyl propionate; aliphatic ketones which preferably have from 3 to 10 carbon atoms, such as acetone, methyl ethyl ketone, diethyl ketone and cyclohexanone; cyclic ethers, in particular tetrahydrofuran and dioxane.

Preferred examples of these solvents are polyethylene glycols having 2-15 ethylene glycol units, polypropylene glycols having 2-6 propylene glycol units and in particular alkoxylation products of $C_6$-$C_{16}$-alcohols (alkylene glycol monoalkyl ethers and polyalkylene glycol monoalkyl ethers).

When an additive (D) is used as a diluent, generally from 1 to 40% by weight, preferably from 1 to 35% by weight, more preferably from 1.5 to 30% by weight, most preferably from 2 to 25% by weight, based in each case on the sum of the components (A), (B) and (C), are used.

In the process according to the invention, polyalkylene oxide (A), graft monomer (B1) and, if appropriate, (B2), initiator (C) and, if appropriate, solvent (D) can be heated to the selected mean polymerization temperature in a tubular reactor segment.

According to the invention, the polymerization is carried out in such a way that an excess of polymer (polyalkylene oxide (A) and formed graft polymer) is constantly present in the tubular reactor segment. The quantitative ratio of polymer to ungrafted monomer and initiator is generally >10:1, preferably >15:1 and more preferably >20:1.

In the case of the particularly preferred, if desired solvent-free process variant, the entire amount, i.e. 90-100%, of polyalkylene oxide (A) is initially fed at the beginning, in the feed side, of the tubular reactor segment and the monomers (B1) and if appropriate (B2), and also the initiator (C) preferably present from 10 to 50% by weight stream and one of the additives, especially solvents (D), are metered in, wherein the temperature being controlled such that the selected polymerization temperature, on average during the polymerization, is maintained with a range of especially +/−10° C., in particular +/−5° C.

In a further particularly preferred, low-solvent process variant, the procedure is as described above, except that additive (D) is metered in during the polymerization in order to regulate the viscosity of the reaction mixture. It is also possible to commence with the metered addition of the solvent only at a later time with advanced polymerization, or to add it in portions.

In another embodiment of the invention, the polymerization is done in the absence of an additive (D), and subsequently the additive (D) is admixed to the graft polymer solution or melt only after the end of the process when the polymerization is finished.

The polymerization is preferably effected under pressure so that all the components are in liquid form, especially component B, whereby the pressure ranges from 2 to 200 bar, preferably from 3 to 100 bar or can be effected under standard pressure or at reduced or elevated pressure. When the boiling point of the monomers (B) or of any additive (D) used, is exceeded at the selected pressure, the polymerization is carried out with cooling.

In another embodiment the water-soluble polyalkylene oxide (A) has a mean molecular weight $M_n$ from 2,500 to 15,000 g/mol, preferably from 3,000 to 13,000 g/mol and more particularly from 5,000 to 10,000 g/mol.

In another embodiment the water-soluble polyalkylene oxide (A) is based on $C_2$ to $C_4$-alkylene oxide, which comprises at least 30% by weight of ethylene oxide in copolymerized form, preferably at least 60% by weight, more preferably at least 75% by weight of ethylene oxide in copolymerized form.

In another embodiment of the present invention, the water-soluble polyalkylene oxide (A) has a polydispersity of $M_w/M_n$ of ≤1.5, preferably a polydispersity $M_w/M_n$ of ≤1.3.

In a preferred embodiment of the continuous process at least one feed side, one tubular reactor segment or one outlet side is equipped with a mixer, in particular with a static mixer. In the sense of the present invention equipped means that the mixer can be inside the feed side, the tubular reactor segment or the outlet side or that the mixer is connected to the feed side, the tubular reactor segment or the outlet side as a separate unit. In a suitable embodiment, mixers have milli-structures which have at least one mixing channel. The mixing can proceed in a creeping, laminar, laminar-chaotic or turbulent manner. Milli-structures are defined by structures with cavities in the millimeter range, especially cavities between 0.1 mm to 50 mm, especially between 1 mm to 10 mm.

In laminar diffusion mixers, substreams of the fluid, which has been fanned out in a microstructure into a multitude of microscopically small flow lamellae with a thickness in the range from 10 to 2000 µm, especially from 20 to 1000 µm and in particular from 40 to 500 µm, are mixed exclusively by molecular diffusion at right angles to the main flow direction.

Laminar diffusion mixers can be configured as simple T or Y mixers or as so-called multilamination mixers. In the case of the T or Y mixer, the two (or else more than two) substreams to be mixed are fed to an individual channel through a T- or Y-shaped arrangement. What is crucial for the transversal diffusion path $S_{Diff}$ here is the channel width $\delta_K$. Typical channel widths between 100 µm and 1 mm give rise to customary mixing times in the range from seconds to minutes for liquids. When, as in the present process, liquids are mixed, it is advantageous to promote the mixing operation additionally, for example by means of flow-induced transverse mixing.

In the case of multilamination mixers or interdigital mixers, the substreams to be mixed are divided in a distributor into a large number of microflow threads and, at the exit of the distributor, are then fed to the mixing zone alternately in lamellae. For liquids, mixing times in the range of seconds are achieved with the conventional multilamination mixers. Since this is insufficient for some applications (for example in the case of fast reactions), the basic principle has therefore been developed further by focusing the flow lamellae additionally by geometric or hydrodynamic means. The geometric focusing is achieved by a constriction in the mixing zone. The hydrodynamic focusing is achieved by two sidestreams which flow toward the main stream at right angles and thus further compress the flow lamellae. The focusing described allows lateral dimensions of the flow lamellae of a few micrometers to be achieved, such that even liquids can be mixed within a few 10 s of ms.

The laminar diffusion mixers with convective crossmixing used may be micromixers with structured walls. In the case of micromixers with structured walls, secondary structures (grooves or projections) are disposed on the channel walls. They are preferably arranged at a particular angle to the main flow direction, for example at an angle of from about 30° up to 90°. In the case of inertia-dominated flow conditions, secondary vortices form as a result, which support the mixing process.

In a further suitable embodiment, the mixer with microstructure used is a split-recombine mixer. Split-recombine mixers are notable for stages composed of recurrent separation and combination of streams. Two regions of an unmixed fluid stream (it is usual to start from two equally large lamellae) are each conducted away from one another in one stage, distributed into two new regions in each case, and combined again. All four regions are arranged alongside one another in alternation such that the original geometry is re-established. In each of these stages, the number of lamellae is thus doubled stage by stage and lamellar thickness and diffusion pathway are thus halved.

Examples of suitable split-recombine mixers are the caterpillar mixer from IMM and the caterpillar mixer from BTS-Ehrfeld.

Examples of suitable dynamic micromixers are, for example, micro-mixing pumps.

Examples of preferred static micromixers are especially the following laminar diffusion mixers:
"chaotic-laminar" mixers, for example T or Y pieces with a very small capillary diameter in the range from 100 µm to 1500 µm and preferably from 100 µm to 800 µm at the mixing point, and cyclone mixers;
ultilamination mixers, for example the LH2 and LH25 slit plate mixers or larger types from Ehrfeld, and the interdigital mixers SIMM and Starlam(R) from IMM;
micromixers according to the multilamination principle with superimposed expanded flow, for example the SuperFocus Interdigital SFIMM microstructure mixer from IMM.

In particular preferred are mixers from SMX Mixers, Kenics, are any static mixers for example like those described in (Pahl, M. H.; Muschelknautz, E.; Chem.-Ing.-Tech. 51 (1979), Nr. 5, S. 347/364).

The static mixers can also be of the type heat exchanger static mixers like those of the company Fluitec, Sulzer or Statiflo.

The Static mixers can be made of steel, or other metals, of Ceramic, out of Teflon or Polypropylene. The polymer static mixers can be reinforced with glass fibers.

The tubular reactor segment with a feed side and an outlet side can preferably be connected in series, whereby at least one segment can be different from the other. The different feature can be one of the above mentioned mixers or the segment dimension.

Preferably, the feed of vinyl acetate takes place where the mixing time is less than five minutes, preferably less than 1 min, most preferably less than 30 s, like in a static mixer, intensive mixer, mixing pump or a rotor/stator device.

In a preferred embodiment of the continuous process at least one tubular reactor segment has a relationship of surface to volume from at least $10\ m^2/m^3$, preferably at least $30\ m^2/m^3$. Preferably with this relationship, the components can be mixed homogeneously so that a statistical distribution of the component (B) at the water-soluble polyalkylene oxide is achieved.

In a preferred embodiment of the continuous process the temperature of the feed side is below the mean polymerization temperature at which the half time of the free radical initiator is more than 5 h. Thereby a clogging or blocking of the feed side can be reduced, ideally the stream rate keeps constant in the feed side and the tubular reactor segment. Thereby the temperature can be increased to start the polymerization after the components are statistically distributed.

In a preferred embodiment of the continuous process the ratio of the length of at least one tubular reactor segment in the direction of the flow of the stream to the diameter is from 1000:1 to 10:1, preferably from 500:1 to 15:1 and in particular from 80:1 to 20:1.

In a preferred embodiment of the continuous process at least one tubular reactor segment is a tubular reactor filled with milli-structured filling, preferably a static mixer. In particular all kind of tubes can be used, whereby the relationship of the lateral length to the diameter of the tube is in the range from 1.6 to 1000, preferably from 5 to 400. In particular the length of the tubular tube can be from 50 cm to 400 cm. The diameter of the tube can be from 0.1 mm to 35 cm.

Reactors for use in accordance with the invention are preferably selected from jacketed tubular reactors, temperature-controllable tubular reactors, tube bundle heat exchangers, plate heat exchangers and temperature-controllable tubular reactors with internals.

In another embodiment the characteristic dimensions of the tube or capillary diameter in laboratory scale can be in the range from 0.1 mm to 25 mm, more preferably in the range from 0.5 mm to 6 mm, even more preferably in the range from 0.7 to 4 mm and especially in the range from 0.8 mm to 3 mm.

In another embodiment the characteristic dimensions of the tube or capillary diameter in industrial scale can be in the range from 0.05 m to 0.35 m, more preferably in the range from 0.1 m to 0.25 m.

Alternatively, it is also possible in accordance with the invention to use plate apparatus comparable flat channels with inlaid mixing structures. They have heights in the range from 1 mm to 20 mm, and widths in the range from 10 mm to 1000 mm and especially in the range from 10 mm to 500 mm.

Optionally, the tubular reactors may comprise mixing elements permeated by temperature control channels (for example of the CSE-XR(R) type from Fluitec, Switzerland).

In a preferred embodiment of the continuous process the polymerization time is up to 2 hours. Because of the flexible choice of the process parameters the polymerization time is up to 2 hours, whereby in contrast to the prior art in a semibatch processes the polymerization times are significantly higher. This results in a better space-time-yield.

In a preferred embodiment of the continuous process the pressure in at least one tubular reactor segment is at least 2 bar, preferably between 2 and 10 bar, and in particular between 2 and 6 bar. Due to the large surface area per reaction volume in the new continuous process, heat transfer is faster and thus the process can be run at wide temperature range. As enough cooling is available through heat exchange with the cooling medium outside the reactor, no evaporative cooling is needed. This allows pressure variation without being limited by the evaporation point of monomers or solvents. For example, water or oil-like components can be used as cooling medium.

In a preferred embodiment of the continuous process the average residence time of at least one of the components (A), (B), (C) or (D) in at least one tubular reactor segment is in a range from 2 min to 30 min, preferably in the range from 4 min to 25 min, in particular from 5 min to 20 min.

In a preferred embodiment of the continuous process the local concentration of the component (B) is held constant over time in the tubular reactor segment. Because of the continuous process, the polymerized product can be withdrawn from the tubular reactor in the same time, meanwhile new components (A), (B), (C) and if desired (D) are streamed in the tubular reactor. In the sense of the present invention as local concentration can be understood that at a specific point in the tubular reactor segment the concentration is constant over time during the reaction.

The present invention further relates to an amphiphilic graft polymer obtainable by free-radical polymerization of an amphiphilic graft polymer obtainable by free-radical polymerization of
- (B) 15 to 85% by weight of a vinyl ester compound composed of
- (B1) 70 to 100% by weight of vinyl acetate and/or vinyl propionate and
- (B2) 0 to 30% by weight of a further ethylenically unsaturated monomer,
in the presence of
- (A) 15 to 70% by weight of a (water-soluble) polyalkylene oxide of mean molar mass $M_n$ of from 1500 to 20000 g/mol,
- (C) 0.1 to 3% by weight, based on component (B), of a free radical-forming initiator and
- (D) 0 to 40% by weight, based on the sum of the components (A), (B) and (C),
of an additive at a mean polymerization temperature at which the initiator (C) has a decomposition half-time of from 1 to 500 min, in a tubular reactor segment with a feed side and an outlet side, wherein the tubular reactor segment has a relationship of surface to volume from at least 10 m²/m³ and wherein the sum of the components (A) to (C), and if desired (D), is 100% by weight.

Preferably an amphiphilic graft polymer obtainable by free-radical polymerization of
- (B) 30 to 85% by weight of a vinyl ester compound composed of
- (B1) 70 to 100% by weight of vinyl acetate and/or vinyl propionate and
- (B2) 0 to 30% by weight of a further ethylenically unsaturated monomer, in the presence of
- (A) 15 to 70% by weight of a (water-soluble) polyalkylene oxide of mean molar mass $M_n$ of from 1500 to 20000 g/mol,
- (C) 0.1 to 3% by weight, based on component (B), of a free radical-forming initiator and
- (D) 0 to 40% by weight, based on the sum of the components (A), (B) and (C),
of an additive at a mean polymerization temperature at which the initiator (C) has a decomposition half-time of from 1 to 500 min, in a tubular reactor segment with a feed side and an outlet side, wherein the tubular reactor segment has a relationship of surface to volume from at least 10 m²/m³ and wherein the sum of the components (A) to (C), and if desired (D), is 100% by weight, and more preferably an amphiphilic graft polymer obtainable by free-radical polymerization of
- (B) 35 to 85% by weight of a vinyl ester compound composed of
- (B1) 70 to 100% by weight of vinyl acetate and/or vinyl propionate and
- (B2) 0 to 30% by weight of a further ethylenically unsaturated monomer,
in the presence of
- (A) 15 to 65% by weight of a (water-soluble) polyalkylene oxide of mean molar mass $M_n$ of from 1500 to 15000 g/mol,
- (C) 0.1 to 3% by weight, based on component (B), of a free radical-forming initiator and
- (D) 0 to 40% by weight, based on the sum of the components (A), (B) and (C),
of an additive at a mean polymerization temperature at which the initiator (C) has a decomposition half-time of from 2 to 500 min, in a tubular reactor segment with a feed side and an outlet side, wherein the tubular reactor segment has a relationship of surface to volume from at least 10 m²/m³ and wherein the sum of the components (A) to (C), and if desired (D), is 100% by weight.

The polyalkylene oxide is preferably water-soluble, wherein water-soluble in the sense of the present invention means a polyalkylene oxide of which at least 50% by weight is soluble in a water.

Owing to their marked amphiphilic character, the inventive graft polymers have particularly favorable interface properties. Advantageously, due to the variation of the process parameters in the inventive process the obtained amphiphilic graft polymer exhibits a smaller amount of free polyvinyl acetate and a wider polarity distribution compared to amphiphilic graft polymer cited in prior art.

In a preferred embodiment according to the inventive graft polymer, the polyalkylene oxide (A) is based on $C_2$ to $C_4$-alkylene oxide, which comprises at least 30% by weight of ethylene oxide in copolymerized form. Polyalkylene oxide suitable for forming the graft base (A) are principally all polymers based on $C_2$ to $C_4$-alkylene oxides which comprise at least 40% by weight, preferably at least 50% by weight, more preferably at least 60% by weight of ethylene oxide in copolymerized form.

In a preferred embodiment in the tubular reactor segment the stream of the reaction mixture is held at a mean polymerization temperature T1 at which the initiator (C) has a decomposition half-time from 1 to 500 min and at least one of the components (A), (B), (C) or (D) is metered in the feed side at a temperature T2 at which the initiator (C) has a decomposition half-time above 500 min.

In another embodiment the tubular reactor segments connected in series are heated that they exhibit an increasing heat gradient in the direction of the stream. Preferably the feed side and the outlet side are not heated by this gradient.

In a further embodiment of the inventive amphiphilic graft polymer the polyalkylene oxide has mean molecular weight $M_n$ from 1,000 to 15,000 g/mol, preferably from 2,000 to 13,000 g/mol and in particular from 3,000 to 9,000 g/mol.

In a further embodiment of the inventive amphiphilic graft polymer the polyalkylene oxide (A) has a polydispersity $M_w/M_n$ of ≤2.5, in particular ≤1.3.

In a further embodiment of the inventive amphiphilic graft polymer, the polymer has a polydispersity $M_w/M_n$ of ≤3, preferably ≤2.8 and in particular ≤2.5.

In a further embodiment the graft polymer has a full width at half maximum of the polarity distribution between >0.3 and <1.0, in particular between >0.35 and <0.8 and preferably between >0.4 and <0.75. Preferably the graft polymer has a full width at half maximum of the polarity distribution between >0.3 and <1.0 and a maximum of a polarity distribution between >0.45 and <1. Preferably the maximum of the polarity distribution is between >0.5 and <0.8. In particular the graft polymer has a full width at half maximum of the polarity distribution between >0.35 and <1.0.

In another embodiment the inventive graft polymer has a polarity distribution with a square root $\sigma^2$ of >18. Preferably the amphiphilic graft polymer has a polarity distribution expressed in % of polyvinylacetate with a square root $\sigma^2$ of >20. In particular the amphiphilic graft polymer has a polarity distribution expressed in % of polyvinylacetate with a square root $\sigma^2$ of >20 and a mean value $\mu$ of <50. Preferably the square root $\sigma^2$ is >20 and the mean value $\mu$ is <45. The method for the determination and the specification are described in the examples.

The present invention further relates to an inventive tubular reactor segment comprising:
  at least two reservoir vessels for liquid streams,
  at least one addition device, which is capable of adding at least one of the components (A), (B), (C) and (D) to the tubular reactor segment at the first feed side of the tubular segment
  at least one addition device, which is capable of adding at least one of the components (A), (B), (C) and (D) to the tubular reactor segment at the second feed side of the tubular segment,
  optionally one or more mixers.

In a further embodiment, the tubular reactor segment comprises for each component (A) to (D) a separate reservoir vessel. In particular the reservoir vessels can be connected directly to the tubular reactor segment or interrupted by a flow meter. Also, the reservoir vessels can be connected to the addition device in which a communication and control unit adds at least one of the components (A) to (D) to the tubular reactor. The starting position of the tubular reactor in the sense of the present invention is the region where the flow of the stream is starting. Is for example the tubular reactor a tube, then the starting position is the position where the reaction is starting and the end of the tube where the reaction mixture is withdrawn. Furthermore, it is possible that at least one addition device can add at least one of the components (A) to (D) to the tubular reactor for example at the middle of the tube.

The present invention further relates to the use of the inventive amphiphilic graft polymers as surfactant booster, dispersion aids, solubilizers, emulsifiers, thickeners and rheology modifiers, foam booster, defoamer, surface modifiers, surface actives polymers and adhesives, as well their use in agriculture and crop protection, cosmetics, chemical-technical applications, construction industry, and in the preparation and treatment of paper, textiles and leather, wood, adhesives, dye and pigment formulations, paints, coatings and varnishs.

The present invention is illustrated with reference to FIG. 1 to FIG. 10, without limiting to these embodiments. For this purpose the following references are used:
A Polyalkylene oxide (stream)
B Vinyl ester component (stream)
C Initiator (stream)
P Product (stream)

The process according to the invention can equally be illustrated by FIG. 1, without being limited to this embodiment. A polyalkylene oxide (A) supply is illustrated, whereby the amount of polyalkylene oxide (A) is in this example 100% of the total amount. In particular, the components (A), (B) and (C) are supplied in form of a stream. This is illustrated by the letters "A, B, C" and the arrows. The polyalkylene oxide (A) stream, optionally combined with an additive (D) stream, flows into the first feed side (1) of the first tubular reactor segment (2). Additionally, 25% of the total amount of a vinyl ester component (B) is fed to the first feed site (1) together with 50% of the total amount of an initiator (C). The three streams are mixed in the first feed side (1) and continue to flow into the first tubular reactor segment (2). In this first tubular reactor segment (2) the polymerisation takes place. The stream continues to flow into the direction of the first outlet side (3), which corresponds to the second feed side (1a) of the second tubular reactor segment (2a). At the first outlet side (3) further 25% of the total amount of the vinyl ester component (B) is introduced. From the first outlet side (3) of the first tubular reactor segment (2) a recycle stream (4) is removed from the first outlet side (3) to the first feed side (1) of the first tubular reactor segment (2). In FIG. 1, five tubular reactor segments (2, 2a, 2b, 2c, 2d) are connected in series, whereby the first four tubular reactor segments (2, 2a, 2b, 2c) have a recycle stream (4, 4a, 4b, 4c). In between the tubular reactor segments (2, 2a, 2b, 2c) 25% of the total amount of component (B) flows into each the feed side (1a, 1b, 1c), whereas at the beginning 50% and before the last tubular reactor segment (2d) also 50% of the total amount of component (C) flows into the feed sides (1,1d). After the reaction mixture flows or streams through the last tubular reactor segment (2d) into the outlet side (3d), the desired stream of an amphiphilic graft polymers (P) is obtained.

The process according to the invention can equally be illustrated by FIG. 2 without being limited to this embodiment. In contrast to FIG. 1, FIG. 2 shows four tubular reactor segments connected in series, whereby only the first and the third tubular reactor segments (2, 2b) have a recycle stream (4, 4a) from the outlet sides (3, 3b) to the feed sides (1, 1b). The first tubular reactor segment (2) is fed over the feed side (1) with 100% of the total amount of component (A) and 50% of components (B) and (C). At a later stage of this process again 50% of components (B), fed into feed side (3a) and (C), fed into feed side (3b), is supplied.

The process according to the invention can equally be illustrated by FIG. 3, without being limited to this embodiment. Four tubular reactor segments are connected in series. 100% of the total amount of component (A) flows through the first feed side (1) into the first tubular reactor segment (2). In addition to this, 50% of the total amount of components (B) and (C) are also supplied to the first feed side (1). At a later stage in this process the residues of the components (C), (B) are supplied into feed side (3a), whereby each is 50% of the total amount In this embodiment the first feed side (1) has a temperature that is below T2 and higher than T3. T2 is the temperature at which the half-time of initiator (C) decomposition is above 500 minutes. T3 is the melting point of the reaction mixture. The tubular segments have a temperature at which the decomposition half-time of the initiator (C) is lower than 120 minutes.

In FIG. 4 the molecular weight distribution determined by size exclusion chromatography is shown. In the case where a nonionic surfactant is used as an additive, this can be seen as one peak in the range of 1000-3000 g/mol. The graft polymer can be seen at higher molecular weight.

In FIG. 5 the GPEC chromatogram is shown. Gradient polymer elution chromatography (GPEC, as described in W. J. Staal "Gradient Polymer Elution Chromatography" Ph. Thesis Eindhoven University of Technology, The Netherlands 1996) is used to separate copolymers according their chemical composition. The separation mechanism of GPEC is based on a combination of precipitation/redissolving mechanism and a mechanism controlled by column interactions (absorption and steric exclusion). The name GPEC does not refer to a specific mechanism but solely describes the technique (Gradient Elution Chromatography) and the application (polymers). In general the working principle of GPEC can be described as follows. A polymer sample is dissolved in a good solvent (tetrahydrofuran). The polymer solution is injected into a non-solvent or a combination of solvent (water)/non-solvent (acetonitrile). The initial conditions are poor in solubility terms for the polymer molecules and phase separation will occur. Two phases are formed: a polymer rich phase and a highly diluted solvent phase. After phase separation the polymer molecules are retained in the system. After injection, a gradient from the initial conditions to the good solvent is applied and during this gradient redissolving of the polymer molecules occurs. The redissolving point (expressed in volume fraction solvent or non-solvent) highly depends on the molar mass and the chemical composition of the polymer molecule. When the polymer molecule is redissolved, interactions with the stationary phase (column interactions) will further control the separation (as described in Cools, Paul J. C. H. "Characterization of copolymers by gradient polymer elution chromatography" Ph. Thesis Eindhoven University of Technology, The Netherlands 1999).

In FIG. 6 a schematic representation of the polarity and the polarity distribution is shown.

In FIG. 7 a calculation of the polarity distribution is shown.
In FIG. 8 a calculation of the polarity distribution is shown.

The process according to the invention can equally be illustrated by FIG. 9, without being limited to this embodiment. Eight tubular reactor segments are connected in series and four streams of component C were fed to the recycle stream.

The process according to the invention can equally be illustrated by FIG. 10, without being limited to this embodiment. Eight tubular reactor segments are connected in series and two streams of component C were fed to the recycle stream.

EXAMPLES

Gel Permeation Chromatography (GPC)

Polymer dispersity is determined by size exclusion chromatography (SEC) using a SEC column set from MZ Analysentechnik (Mainz, Germany) (column type MZ-Gel SD Plus, highly cross-linked styrene/divinylbenzene copolymer, particle size 5 μm; (1st column: L: 300 mm, ID: 8 mm, Porosity: 100 Å; 2nd column: L: 300 mm; ID: 8 mm, Porosity: 10e3 Å; 3rd column: L: 300 mm; ID: 8 mm; Porosity: 10e5 Å; 4th column: L: 300 mm, ID: 8 mm, Porosity: 10e6 Å)); eluent: tetrahydrofuran, flow rate: 1.00 ml/min; injection volume: 100.00 μl, column temperature: 35° C.; sample concentrations in the range of 0.1-0.2 wt %, calibrated by using polystyrene standards from Polymer Standards Service (Mainz, Germany) in the range from 374 g/mol to 2,180,000 g/mol, WINGPC from Polymer Standards Service (Mainz, Germany) was used for calibration.

Gradient Polymer Elution Chromatography (GPEC):

Test solutions were prepared by dissolving polymer samples in tetrahydrofuran (THF) with a concentration of 10 g/l. Of the solution, 2 μl were injected in the HPLC measurement device. The separation was done using a Waters XBridge Hilic HPLC column with dimensions of 4.6×50 mm and a particle size of 2.5 μm. The eluent starting conditions were 100% acetonitrile (ACN), after 0.3 ml the composition was changed linear to a composition of 60%/40% water/acetonitrile within 5.7 ml. Subsequently, the composition was changed to 95%/5% water/acetonitrile within 0.3 ml. The chromatographic column was rinsed using 1.5 ml of the last mentioned eluent composition and reset within 0.3 ml to initial condition. The volumetric flow was 3 ml/min and the column temperature was 80° C. For detection, an evaporative light scattering detector (ELSD, type PL-ELS 2100 by Polymer Laboratories GmbH, Darmstadt) was used (ELSD conditions: blue LED wavelength=480 nm, evaporation temperature=85° C., nebulizer temperature=50° C., gas flow=1.5 SLM (standard liter per minute)).

Column: Waters XBridge Hilic; i.D. 4.6 mm; length 50 mm; column temperature: 80° C., flow rate: 3 ml/min; injection volume: 2 ml; concentration: 10 mg/ml; gradient.

| Volume | H$_2$O by weight | ACN by weight | Time in min |
|--------|------------------|---------------|-------------|
| 0.15   | 0                | 100           | 0           |
| 0.45   | 0                | 100           | 0.1         |
| 6.15   | 60               | 40            | 2           |
| 6.25   | 95               | 5             | 2.033       |

As reference materials, polyethylene glycol (molecular weight M$_n$=6000 g/mol, available as Pluriol® E 6000 from BASF SE), and polyvinylacetate (molecular weight 50 000 g/mol, available from Alfa Aesar Company (Polyvinyl acetate M.W. ca 50 000, order number A12732, lot-number 10163914) were used. Care must be taken that the molecular weight of the polyethylene glycol reference is the same as that of the polyethylene glycol used as the graft base (compound A) for the synthesis of the amphiphilic graft polymer.

The relative polarity and the polarity distribution of the amphiphilic graft polymer can be determined by analyzing the GPEC signals of the graft polymer sample as well as polyethylene glycol and polyvinylacetate as reference compounds. The quantification of the polarity of the product is performed by analyzing the results from the GPEC chromatograms, either considering them as non-normal distributions (Modern Engineering Statistics, Thomas P. Ryan, Wiley-Interscience, John Wiley & Sons, Inc., Hoboken, N.J., 2007) or taking the maximum of the polarity distribution and the full width at half maximum of the polarity distribution. Two homopolymers were used as reference to convert these chromatograms into a polarity distribution expressed in % of polyvinylacetate. That means that μ is 0, when polyvinylacetat is 0 and μ is 1, when polyethyleneglycol is 1. To describe the shape of the distribution of the polymers' polarity, the second central moment, σ$^2$, and its mean value, p, were calculated. The square root of σ$^2$ is the analogue of the standard deviation for a continuous univariate probability distribution. By comparing the value of a for the different graft polymer samples, a measure of the width, or spread, around the expected value µ of the polarity can be obtained.

The following table summarizes the polarity distribution characterized by a maximum of the polarity distribution and the full width at half maximum at the polarity distribution:

|  | Maximum of the polarity distribution | Full width at half maximum |
|---|---|---|
| Example 23 | 0.529 | 0.42 |
| Example 1 | 0.502 | 0.43 |
| Example 22 | 0.500 | 0.61 |
| Example 12 | 0.556 | 0.50 |
| Example 24 | 0.595 | 0.39 |
| Comparative Example 1 | 0.407 | 0.28 |
| Comparative Example 2 | 0.413 | 0.32 |
| Comparative Example 3 | 0.700 | 0.28 |

Materials:

Additive D1: Nonionic (N10) surfactant 1: alkoxylated singly-branched C10-guerbet alcohol, cloud point approx. 80° C. (measured according to EN 1890, method A), available as Lutensol XL100

Additive D2: NIO surfactant 2: alkoxylated singly-branched C10-guerbet alcohol, cloud point approx. 71° C. (measured according to EN 1890, method D), available as Lutensol XL70

Additive D3: NIO surfactant 3: alkoxylated singly-branched C10-guerbet alcohol, cloud point approx. 60° C. (measured according to EN 1890, method E), available as Lutensol XL50

Polyalkylene glykol A: PEG 6000, polyethylene glycol with molecular weight of Mn 6000 g/mol, available for example as Pluriol® E6000.

Initiator C: tert.-Butylperoxy-2-ethylhexanoate: for example available as "Trigonox 21 S" from Akzo Nobel The eight tubular reactor segments denoted as 2-2g were used to run the polymerisation. The void volume of the tubular reactor segments 2-2c is 45 ml each and that of the tubular reactor segments 2d-2g is 130 ml. Each of the tubular reactor segments 2-2g is 50 cm long and the inner diameter of the tubular reactor segments 2-2c is 1.2 cm and that of the tubular reactor segments 2d-2g is 2.3 cm. These tubular reactor segments are filled with SMX static mixers from the company Fluitec and they have 'inlet' denoted as the feed side and 'outlet' denoted as outlet side. The pumps used in this setup were micro annular gear pumps, supplied by company HNP Mikrosysteme GmbH.

These tubular reactor segments have been operated in series, where the outlet of tubular reactor segment 2 is connected to the feed side of the segment 2a.

Example 1

To the feed side of the tubular reactor segment 2 a stream composed of a mixture of 172 g/h of PEG 6000 (component A), 27.1 g/h of Lutensol® XL 100 (component D) at 85° C. and 64.5 g/h of vinyl acetate (component B) at room temperature were fed. A stream of the outlet side of the tubular reactor segment 2c was recycled back with a gear pump to the feed side of the tubular reactor segment 2 at a rate of 4500 g/h. A stream of 9.6 g/h of a 25 wt % of Trigonox® 21 S solution in tripropylene glycol (component C) at room temperature were fed in this recycle stream directly before the gear pump (at the suction side). The temperature of the tubular reactor segments 2-2c was 92° C. A stream of the outlet side of the tubular reactor segment 2d was recycled back with a gear pump to a dynamic mixer connected to the feed side of 2d at a rate of 4500 g/h (the recycled stream enters the gear pump→dynamic mixer→feed seed of 2d). A stream of 64.5 g/h of vinyl acetate (component B) at room temperature was fed in this recycled stream directly before the gear pump (at the suction side). The temperature of the tubular reactor segment 2d was 91° C. A stream of the outlet side of the tubular reactor segment 2e was recycled back with a gear pump to a dynamic mixer connected to the feed side of 2e at a rate of 4500 g/h recycle stream enters the gear pump-dynamic mixer 4 feed seed of 2e). A stream of 64.5 g/h of vinyl acetate (component B) at room temperature was fed in this recycle stream directly before the gear pump (at the suction side). The temperature of the tubular reactor segment 2e was 90.5° C. A stream of the outlet side of the tubular reactor segment 2f was recycled back with a gear pump to a dynamic mixer connected to the feed side of 2e at a rate of 4500 g/h (the recycled stream enters the gear pump→dynamic mixer→feed seed of 2f). A stream of 64.5 g/h of vinyl acetate (component B) at room temperature was fed in this recycled stream directly before the gear pump (at the suction side). The temperature of 2f was 90.5° C. To the feed side of the tubular reactor segment 2g a stream of 9.6 g/h of a 25 wt % of Trigonox® 21 S solution in tripropylene glycol (component C) at room temperature was fed. The temperature of the tubular reactor segment 2g was 100° C. and the pressure at the outlet side of 2g was regulated by a pressure regulation bar and kept constant at 8 bar.

Example 2

To the feed side of the tubular reactor segment 2 a stream of 182 g/h of PEG6000 (component A) at 85° C. and a stream of 28.6 g/h of Lutensol® XL 100 (component D) at 85° C. and a stream of 12.6 g/h of a 25 wt.-% of Trigonox® 21 S solution in tripropylene glycol (component C) at room temperature were fed. A stream of 273 g/h of vinyl acetate (component B) was fed to the feed side of the tubular reactor segment 2a at room temperature. The temperature of tubular reactor segments 2 to 2g was 95° C. The pressure at the outlet side of 2g was regulated by a pressure regulation bar and kept constant at 4 bar.

Example 3

To the feed side of the tubular reactor segment 2 a stream of 137 g/h of PEG 6000 (component A) at 85° C. and a stream of 21.6 g/h of Lutensol® XL 100 (component D) at 85° C. and a stream of 9.5 g/h of a 25 wt % of Trigonox® 21 S solution in tripropylene glycol (component C) were fed at room temperature. A stream of 205.5 g/h of vinyl acetate (component B) was fed to the feed side of the tubular reactor segment 2a at room temperature. The temperature of tubular reactor segments 2 to 2g was 95° C. The pressure at the outlet side of 2g was regulated by a pressure regulation bar and kept constant at 5 bar.

Example 4

To the feed side of tubular reactor segment 2 a stream of 91 g/h of PEG 6000 (component A) at 85° C. and a stream of 14.3 g/h of Lutensol® XL 100 (component D) at 85° C. and a stream of 6.3 g/h of a 25 wt % of Trigonox® 21 S solution in tripropylene glycol (component C) at room temperature were fed. A stream of 136.5 g/h of vinyl acetate (component B) was fed to the feed side of the tubular reactor segment 2a at room temperature. The temperature of tubular reactor segments 2 to 2g was 95° C. The pressure at the outlet side of 2g was regulated by a pressure regulation bar and kept constant at 6 bar.

Example 5

To the feed side of tubular reactor segment 2 a stream of 167.7 g/h of PEG 6000 (component A) at 85° C. and a stream of 26.4 g/h of Lutensol® XL 100 (component D) at 85° C. and a stream of 20.8 g/h of a 25 wt % of Trigonox® 21 S solution in tripropylene glycol (component C) were fed at room temperature. A stream of the outlet side of the tubular reactor segment 2e was recycled back with a gear pump to the feed side of the tubular reactor segment 2 at a rate of 600 g/h. In the recycle stream a stream of 251.6 g/h of vinyl acetate (component B) was fed directly before the gear pump (between tubular reactor segment 2e outlet side and tubular reactor segment 2 feed side) at room temperature. The temperature of tubular reactor segments 2 to 2g was 94° C. The pressure at the outlet side of 2g was regulated by a pressure regulation bar and kept constant at 6 bar.

Example 6

To the feed side of tubular reactor segment 2 a stream of 167.7 g/h of PEG 6000 (component A) at 85° C. and a stream of 26.4 g/h of Lutensol® XL 100 (component D) at 85° C. and a stream of 20.8 g/h of a 25 wt % of Trigonox® 21 S solution in tripropylene glycol (component C) were fed at room temperature. A stream of the outlet side of the tubular reactor segment 2c was recycled back with a gear pump to the feed side of the tubular reactor segment 2 at a rate of 180 g/h. In the recycle stream a stream of 106.1 g/h of vinyl acetate (component B) was fed directly before the gear pump (between tubular reactor segment 2c outlet side and tubular reactor segment 2 feed side) at room temperature. The temperature of tubular reactor segments 2 to 2g was 95° C. To the feed side of the tubular reactor segments 2d and 2f two streams of vinyl acetate (component B), each of 72.7 g/h, were fed at room temperature. The pressure at the outlet side of 2g was regulated by a pressure regulation bar and kept constant at 6 bar.

Example 7

A stream of 167.7 g/h of PEG 6000 (component A) at 85° C. and a stream of 20.8 g/h of a 25 wt % of Trigonox® 21 S solution in tripropylene glycol (component C) were fed at room temperature to the feed side of tubular reactor segment 2. A stream of the outlet side of the tubular reactor segment 2c was recycled back with a gear pump to the feed side of the tubular reactor segment 2 at a rate of 180 g/h. In the recycle stream a stream of 106.1 g/h of vinyl acetate (component B) was fed directly before the gear pump (between tubular reactor segment 2c outlet side and tubular reactor segment 2 feed side) at room temperature. The temperature of tubular reactor segments 2 to 2g was 95° C. To the feed side of the tubular reactor segments 2d and 2f two streams of vinyl acetate (component B), each of 72.7 g/h, were fed at room temperature. The pressure at the outlet side of 2g was regulated by a pressure regulation bar and kept constant at 6 bar.

Example 8

A stream composed of a mixture of 167.7 g/h of PEG 6000 and 26.4 g/h of Lutensol®XL 100 at 85° C. and a stream of 251.7 g/h of vinyl acetate at room temperature were fed to the feed side of the tubular reactor segment 2. A stream of the outlet of the tubular reactor segment 2c was recycled back with a gear pump to the feed side of the tubular reactor segment 2 at a rate of 4500 g/h. A stream of 10.3 g/h of a 25 wt % of Trigonox® 21 S solution in tripropylene glycol at room temperature was fed to the feed side of segment 2f. The temperature of the tubular reactor segments 2-2c was 93° C. The temperature of the tubular reactor segments 2d-2g was 93° C. The pressure at the outlet side of 2g was regulated by a pressure regulation bar and kept constant at 6 bar.

Example 9

A stream of 167.7 g/h of PEG 6000 at 85° C. and a stream of 251.7 g/h of vinyl acetate at room temperature were fed to the feed side of the tubular reactor segment 2. A stream of the outlet of the tubular reactor segment 2c was recycled back with a gear pump to the feed side of the tubular reactor segment 2 at a rate of 4500 g/h. A stream of 10.3 g/h of a 25 wt % of Trigonox® 21 S solution in tripropylene glycol at room temperature was fed to the feed side of segment 2f. The temperature of the tubular reactor segments 2-2c was 93° C. The temperature of the tubular reactor segments 2d-2g was 93° C. The pressure at the outlet side of 2g was regulated by a pressure regulation bar and kept constant at 6 bar.

Example 10

A stream composed of a mixture of 132.2 g/h of PEG 6000 at 85° C. was fed to the feed side of reactor segment 2. A stream of 198.3 g/h of vinyl acetate at room temperature was fed to feed side of segment 2d and a stream of 9.1 g/h of a 25 wt % of Trigonox® 21 S solution in tripropylene glycol at room temperature were fed to the feed side of the tubular reactor segment 2c. A stream of the outlet of the tubular reactor segment 2d was recycled back with a gear pump to the feed side of the tubular reactor segment 2e at a rate of 3200 g/h. To the feed side of the tubular reactor segment 2f a stream of 7.2 g/h of a 25 wt % of Trigonox® 21 S solution in tripropylene glycol at room temperature were fed. The temperature of the tubular reactor segments 2-2c was 88° C. The temperature of the tubular reactor segments 2d-2g was 91° C. The pressure at the outlet side of 2g was regulated by a pressure regulation bar and kept constant at 6 bar.

Example 11

A stream of 182 g/h of PEG 6000 at 85° C. and a stream of 273 g/h of vinyl acetate at room temperature were fed to a dynamic mixer that is attached to feed side of segment 2. A stream of the outlet of the tubular reactor segment 2c was recycled back with a gear pump to the feed side of the tubular reactor segment 2 at a rate of 4500 g/h. A stream of 10 g/h of a 25 wt % of Trigonox® 21 S solution in tripropylene glycol at room temperature were fed in this recycled stream directly before the gear pump (at the suction side). The temperature of the tubular reactor segments 2-2c was 90° C. The temperature of the tubular reactor segments 2d-2g was 88° C. The pressure at the outlet side of 2g was regulated by a pressure regulation bar and kept constant at 6 bar.

Example 12

A stream of 182 g/h of PEG 6000 at 85° C. and a stream of 273 g/h of vinyl acetate at room temperature were fed to a dynamic mixer that is attached to feed side of segment 2. A stream of the outlet of the tubular reactor segment 2c was recycled back with a gear pump to the feed side of the tubular reactor segment 2 at a rate of 4500 g/h. A stream of 5 g/h of a 25 wt % of Trigonox® 21 S solution in tripropylene glycol at room temperature were fed in this recycled stream directly before the gear pump (at the suction side). The temperature of the tubular reactor segments 2-2c was 90° C. The temperature of the tubular reactor segments 2d-2g was 88° C. The pressure at the outlet side of 2g was regulated by a pressure regulation bar and kept constant at 6 bar.

Example 13

A stream of 178 g/h of PEG 6000 at 85° C. and a stream of 267 g/h of vinyl acetate at room temperature were fed to a dynamic mixer that is attached to feed side of segment 2. A stream of the outlet of the tubular reactor segment 2c was recycled back with a gear pump to the feed side of the tubular reactor segment 2 at a rate of 4500 g/h. A stream of 20 g/h of a 25 wt % of Trigonox® 21 S solution in tripropylene glycol at room temperature were fed in this recycled stream directly before the gear pump (at the suction side). The temperature of the tubular reactor segments 2-2c was 90° C. The temperature of the tubular reactor segments 2d-2g was 88° C. The pressure at the outlet side of 2g was regulated by a pressure regulation bar and kept constant at 6 bar.

Example 14

A stream of 303 g/h of PEG 6000 at 85° C. and a stream of 151.5 g/h of vinyl acetate at room temperature were fed to a dynamic mixer that is attached to feed side of segment 2. A stream of the outlet of the tubular reactor segment 2c was recycled back with a gear pump to the feed side of the tubular reactor segment 2 at a rate of 4500 g/h. A stream of 10 g/h of a 25 wt % of Trigonox® 21 S solution in tripropylene glycol at room temperature were fed in this recycled stream directly before the gear pump (at the suction side). The temperature of the tubular reactor segments 2-2c was 90° C. The temperature of the tubular reactor segments 2d-2g was 88° C. The pressure at the outlet side of 2g was regulated by a pressure regulation bar and kept constant at 6 bar.

Example 15

A stream of 303 g/h of PEG 6000 at 85° C. and a stream of 151.5 g/h of vinyl acetate at room temperature were fed to a dynamic mixer that is attached to feed side of segment 2. A stream of the outlet of the tubular reactor segment 2c was recycled back with a gear pump to the feed side of the tubular reactor segment 2 at a rate of 9000 g/h. A stream of 10 g/h of a 25 wt % of Trigonox® 21 S solution in tripropylene glycol at room temperature were fed in this recycled stream directly before the gear pump (at the suction side). The temperature of the tubular reactor segments 2-2c was 90° C. The temperature of the tubular reactor segments 2d-2g was 88° C. The pressure at the outlet side of 2g was regulated by a pressure regulation bar and kept constant at 6 bar.

Example 16

A stream of 182 g/h of PEG 6000 at 85° C. and a stream of 136.5 g/h of vinyl acetate at room temperature were fed to a dynamic mixer that is attached to feed side of segment 2. A stream of the outlet of the tubular reactor segment 2c was recycled back with a gear pump to the feed side of the tubular reactor segment 2 at a rate of 4500 g/h. A stream of 10 g/h of a 25 wt % of Trigonox® 21 S solution in tripropylene glycol at room temperature were fed in this recycled stream directly before the gear pump (at the suction side). The temperature of the tubular reactor segments 2-2c was 92° C. A stream of the outlet of the tubular reactor segment 2d was recycled back with a gear pump to a dynamic mixer connected to the feed side of 2d at a rate of 4500 g/h (the recycled stream enters the gear pump-Mynamic mixer feed seed of 2d). A stream of 136.5 g/h of vinyl acetate at room temperature was fed in this recycled stream directly before the gear pump (at the suction side). The temperature of the tubular reactor segments 2d-2g was 93° C. and the pressure at the outlet side of the segment 2g was regulated with a regulation valve at 6 bar.

Example 17

A stream of 182 g/h of PEG 6000 at 85° C. and a stream of 182 g/h of vinyl acetate at room temperature were fed to a dynamic mixer that is attached to feed side of segment 2. A stream of the outlet of the tubular reactor segment 2c was recycled back with a gear pump to the feed side of the tubular reactor segment 2 at a rate of 4500 g/h. A stream of 10 g/h of a 25 wt % of Trigonox® 21 S solution in tripropylene glycol at room temperature were fed in this recycled stream directly before the gear pump (at the suction side). The temperature of the tubular reactor segments 2-2c was 92° C. A stream of the outlet of the tubular reactor segment 2d was recycled back with a gear pump to a dynamic mixer connected to the feed side of 2d at a rate of 4500 g/h (the recycled stream enters the gear pump→dynamic mixer→feed seed of 2d). A stream of 91 g/h of vinyl acetate at room temperature was fed in this recycled stream directly before the gear pump (at the suction side). The temperature of the tubular reactor segments 2d-2g was 93° C. and the pressure at the outlet side of the segment 2g was regulated with a regulation valve at 5 bar.

Example 18

A stream composed of a mixture of 162.7 g/h of PEG 6000 and 25.6 g of Lutensol XL100 at 85° C. and a stream of 122 g/h of vinyl acetate at room temperature were fed to a dynamic mixer that is attached to the feed side of segment 2. A stream of the outlet of the tubular reactor segment 2c was recycled back with a gear pump to the feed side of the tubular reactor segment 2 at a rate of 4500 g/h. A stream of 10 g/h of a 25 wt % of Trigonox® 21 S solution in tripropylene glycol at room temperature were fed in this recycled stream directly before the gear pump (at the suction side). The temperature of the tubular reactor segments 2-2c was 92° C. A stream of the outlet of the tubular reactor segment 2d was recycled back with a gear pump to a dynamic mixer connected to the feed side of 2d at a rate of 4500 g/h (the recycled stream enters the gear pump→dynamic mixer→feed seed of 2d). A stream of 122 g/h of vinyl acetate at room temperature was fed in this recycled stream directly before the gear pump (at the suction side). The temperature of the tubular reactor segments 2d-2g was 93° C. and the pressure at the outlet side of the segment 2g was regulated with a regulation valve at 5 bar.

Example 19

A stream of 261 g/h of PEG 6000 at 85° C. and a stream of 97.9 g/h of vinyl acetate at room temperature were fed to a dynamic mixer that is attached to feed side of segment 2. A stream of the outlet of the tubular reactor segment 2c was recycled back with a gear pump to the feed side of the tubular reactor segment 2 at a rate of 9600 g/h. A stream of 10 g/h of a 25 wt % of Trigonox® 21 S solution in tripropylene glycol at room temperature were fed in this recycled stream directly before the gear pump (at the suction side). The temperature of the tubular reactor segments 2-2c was 92° C. A stream of the outlet of the tubular reactor segment 2d was recycled back with a gear pump to a dynamic mixer connected to the feed side of 2d at a rate of 9,600 g/h (the recycled stream enters the gear pump→dynamic mixer→feed seed of 2d). A stream of 97.9 g/h of vinyl acetate at room temperature was fed in this recycled stream directly before the gear pump (at the suction side). The temperature of the tubular reactor segments 2d-2g was 93° C. and the pressure at the outlet side of the segment 2g was regulated with a regulation valve at 5 bar.

Example 20

A stream of 258 g/h of PEG 6000 at 85° C. and a stream of 96.8 g/h of vinyl acetate at room temperature were fed to a dynamic mixer that is attached to feed side of segment 2. A stream of the outlet of the tubular reactor segment 2c was recycled back with a gear pump to the feed side of the tubular reactor segment 2 at a rate of 4500 g/h. A stream of 14.3 g/h of a 25 wt % of Trigonox® 21 S solution in tripropylene glycol at room temperature were fed in this recycled stream directly before the gear pump (at the suction side). The temperature of the tubular reactor segments 2-2c was 92° C. A stream of the outlet of the tubular reactor segment 2d was recycled back with a gear pump to a dynamic mixer connected to the feed side of 2d at a rate of 4500 g/h (the recycled stream enters the gear pump→dynamic mixer→feed seed of 2d). A stream of 96.8 g/h of vinyl acetate at room temperature was fed in this recycled stream directly before the gear pump (at the suction side). The temperature of the tubular reactor segments 2d-2g was 93° C. and the pressure at the outlet side of the segment 2g was regulated with a regulation valve at 5 bar.

Example 21

A stream of 228 g/h of PEG 6000 at 85° C. and a stream of 114 g/h of vinyl acetate at room temperature were fed to a dynamic mixer that is attached to feed side of segment 2. A stream of the outlet of the tubular reactor segment 2c was recycled back with a gear pump to the feed side of the tubular reactor segment 2 at a rate of 4800 g/h. A stream of 12.7 g/h of a 25 wt % of Trigonox® 21 S solution in tripropylene glycol at room temperature were fed in this recycled stream directly before the gear pump (at the suction side). The temperature of the tubular reactor segments 2-2c was 92° C. A stream of the outlet of the tubular reactor segment 2d was recycled back with a gear pump to a dynamic mixer connected to the feed side of 2d at a rate of 4800 g/h (the recycled stream enters the gear pump→dynamic mixer→feed seed of 2d). A stream of 114 g/h of vinyl acetate at room temperature was fed in this recycled stream directly before the gear pump (at the suction side). The temperature of the tubular reactor segments 2d-2g was 93° C. and the pressure at the outlet side of the segment 2g was regulated with a regulation valve at 5 bar.

Example 22

A stream of 180 g/h of PEG 6000 at 85° C. and a stream of 270 g/h of vinyl acetate at room temperature were fed to a dynamic mixer that is attached to feed side of segment 2. A stream of the outlet of the tubular reactor segment 2c was recycled back with a gear pump to the feed side of the tubular reactor segment 2 at a rate of 4500 g/h. A stream of 15 g/h of a 25 wt % of Trigonox® 21 S solution in tripropylene glycol at room temperature were fed in this recycled stream directly before the gear pump (at the suction side). The temperature of the tubular reactor segments 2-2c was 90° C. The temperature of the tubular reactor segments 2d-2g was 88° C. The pressure at the outlet side of 2g was regulated by a pressure regulation bar and kept constant at 5 bar.

Example 23

The reactor is made up of 3 segments denoted as 2, 2a and 2b. Segment 2 is a steel tube with a length of 20 m and internal diameter of 4 mm with a void volume of 251 ml. Segment 2a is a steel tube with a length of 10 m and internal diameter of 6 mm with a void volume of 283 ml. Segment 2b is a steel tube with a length of 10 m and internal diameter of 8 mm with a void volume of 283 ml. These 3 segments were immersed in oil bath. These tubular reactor segments have been operated in series, where the outlet of segment 2 is connected to the feed side of the segment 2a and the outlet of segment 2a is connected to the feed side of the segment 2b. A stream composed of a mixture of 255 g/h of PEG 6000, 67 g/h of Lutensol® XL 100 and 158 g/h and 31.5 g of a 25 wt % of Trigonox® 21 S solution in tripropylene glycol at 60° C. were fed to the feed side of segment 2. A stream of the outlet side of segment 2a was recycled back with a gear pump to the feed side of segment 2 at a rate of 696 g/h. The oil bath in which the 3 reactor segments were immersed had a temperature of 90° C. Segment 2 had a pressure of 6.9 bar, segment 2a had a pressure of 6.4 bar and segment 2b had a pressure of 3.9 bar.

Example 24

Materials:
Polyalkylene glykol A: PEG 4000, polyethylene glycol with molecular weight of Mn 4000 g/mol, available for example as Pluriol® E4000.
Monomer B: Vinyl acetate and Butyl acrylate
Initiator C: tert.-Butylperoxy-2-ethylhexanoate: for example available as "Trigonox® 21 S" from Akzo Nobel The eight tubular reactor segments denoted as 2-2h (see FIG. 9) were used to run the polymerisation. The void volume of the tubular reactor segments 2, 2b, 2d, and 2f is 56.5 ml each and that of the tubular reactor segments 2a, 2c, 2e, and 2g is 208 ml. The segment 2h has an inner diameter of 6 mm and a length of 2 m and a volume of 56.5 ml. Each of the tubular reactor segments 2-2g is 50 cm long and the inner diameter of the tubular reactor segments 2, 2b, 2d, and 2f is 1.2 cm and that of the tubular reactor segments 2a, 2c, 2e, and 2g is 2.3 cm. These tubular reactor segments were empty and no inserts like static mixers were used and they have 'inlet' denoted as the feed side and 'outlet' denoted as outlet side. The pumps used in this setup were gear pumps from the company Gather.

These tubular reactor segments were connected to form 4 Loops in series. Each Loop was consisting of 2 segments (Loop1: Segment 2 and 2a, Loop2: Segment 2b and 2c, Loop 3: Segment 2d and 2e, Loop 4: Segment 2f and 2g), where the outlet side of one segment was recycled to the feed side of the second segment making the loop. Each Loop was consisting of one big segment (i.e. inner diameter of 2.3 cm) and one small segment (i.e. inner diameter of 1.2 cm).

A stream of the outlet side of the tubular reactor segment 2a was recycled back with a gear pump to the feed side of the tubular reactor segment 2 at a rate of 108 kg/h.

A stream of the outlet side of the tubular reactor segment 2c was recycled back with a gear pump to the feed side of the tubular reactor segment 2b at a rate of 108 kg/h.

A stream of the outlet side of the tubular reactor segment 2e was recycled back with a gear pump to the feed side of the tubular reactor segment 2d at a rate of 92 kg/h.

A stream of the outlet side of the tubular reactor segment 2g was recycled back with a gear pump to the feed side of the tubular reactor segment 2f at a rate of 80 kg/h.

To the feed side of the tubular reactor segment 2 a stream composed of 369 g/h of PEG 4000 (component A) was fed.

2 streams, each 123 g/h of a mixture of vinyl acetate and Butyl acrylate (92 wt % Vinyl acetate and 8 wt % Butyl acrylate) (component B) at room temperature were fed to loop 1 and loop 2 at the feed side of segment 2a and 2c respectively.

2 streams (each 10.3 g/h) of a 25 wt % of Trigonox® 21 S solution in tripropylene glycol (component C) at room temperature were fed in the recycle stream of Loop1 and Loop 2 directly after the gear pump (at the pressure side).

Also, 2 streams (each 5.1 g/h) of a 25 wt % of Trigonox® 21 S solution in tripropylene glycol (component C) at room temperature were fed in the recycle stream of Loop 3 and Loop 4 directly after the gear pump (at the pressure side).

The temperature of the tubular reactor segments 2-2g was 105° C. The temperature of the tubular reactor segment 2h was 120° C.

The pressure at the outlet side of 2h was regulated by a pressure regulation valve and was kept constant at 15 bar.

Example 25

Materials:
Polyalkylene glykol A: PEG 4000, polyethylene glycol with molecular weight of Mn 4000 g/mol, available for example as Pluriol® E4000.

Monomer B: Vinyl acetate and Butyl acrylate
Initiator C: tert.-Butylperoxy-2-ethylhexanoate: for example available as "Trigonox® 21 S" from Akzo Nobel Additive D1: Nonionic (NIO) surfactant 1: alkoxylated singly-branched C10-guerbet alcohol, cloud point approx. 80° C. (measured according to EN 1890, method A), available as Lutensol® XL100

The eight tubular reactor segments denoted as 2-2h (see FIG. 10) were used to run the polymerisation. The void volume of the tubular reactor segments 2, 2b, 2d, and 2f is 56.5 ml each and that of the tubular reactor segments 2a, 2c, 2e, and 2g is 208 ml. The segment 2h has an inner diameter of 6 mm and a length of 2 m and a volume of 56.5 ml. Each of the tubular reactor segments 2-2g is 50 cm long and the inner diameter of the tubular reactor segments 2, 2b, 2d, and 2f is 1.2 cm and that of the tubular reactor segments 2a, 2c, 2e, and 2g is 2.3 cm. These tubular reactor segments were empty and no inserts like static mixers were used and they have 'inlet' denoted as the feed side and 'outlet' denoted as outlet side. The pumps used in this setup were gear pumps from the company Gather.

These tubular reactor segments were connected to form 4 Loops in series. Each Loop was consisting of 2 segments (Loop1: Segment 2 and 2a, Loop2: Segment 2b and 2c, Loop 3: Segment 2d and 2e, Loop 4: Segment 2f and 2g), where the outlet side of one segment was recycled to the feed side of the second segment making the loop. Each Loop was consisting of one big segment (i.e. inner diameter of 2.3 cm) and one small segment (i.e. inner diameter of 1.2 cm).

A stream of the outlet side of the tubular reactor segment 2a was recycled back with a gear pump to the feed side of the tubular reactor segment 2 at a rate of 108 kg/h.

A stream of the outlet side of the tubular reactor segment 2c was recycled back with a gear pump to the feed side of the tubular reactor segment 2b at a rate of 108 kg/h.

A stream of the outlet side of the tubular reactor segment 2e was recycled back with a gear pump to the feed side of the tubular reactor segment 2d at a rate of 92 kg/h.

A stream of the outlet side of the tubular reactor segment 2g was recycled back with a gear pump to the feed side of the tubular reactor segment 2f at a rate of 80 kg/h.

To the feed side of the tubular reactor segment 2 a stream composed of 423.4 g/h at 80° C. of PEG 4000 (component A) and 66.6 g/h of Lutensol XL100 (Component D1) was fed.

2 streams, each 212.8 g/h of vinyl acetate (component B) at room temperature were fed to loop 1 and loop 2 at the feed side of segment 2a and 2c respectively.

2 streams (each 27.1 g/h) of a 25 wt % of Trigonox® 21 S solution in tripropylene glycol (component C) at room temperature were fed in the recycle stream of Loop1 and Loop 2 directly after the gear pump (at the pressure side).

The temperature of the tubular reactor segments 2-2g was 105° C. The temperature of the tubular reactor segment 2h was 120° C.

The pressure at the outlet side of 2h was regulated by a pressure regulation valve and was kept constant at 15 bar.

Comparative Example 1:

A graft polymer of the composition PEG6000 (40 wt.-%)/vinyl acetate (60 wt.-%) is prepared in a semibatch process according to EP-A-219 048 is prepared.

Comparative Example 2:

A graft polymer of the composition PEG6000 (40 wt.-%)/vinyl acetate (60 wt-%) is prepared in a semibatch process according to WO 2007/138053 A1.

Comparative Example 3:

A graft polymer of the composition PEG4000 (40 wt.-%)/vinyl acetate (60 wt.-%) is prepared in a semibatch process according to WO 2007/138053 A1.

The invention claimed is:

1. A continuous process for the preparation of amphiphilic graft polymers, wherein a vinyl ester component (B) composed of vinyl acetate and/or vinyl propionate (B1) and, optionally, a further ethylenically unsaturated monomer (B2), is polymerized in the presence of a polyalkylene oxide (A), a free radical-forming initiator (C) and, optionally, an additive (D), at a mean polymerization temperature at which the initiator (C) has a decomposition half-time of from 1 to 500 min, in at least one tubular reactor segment with a feed side and an outlet side, through which the reaction mixture comprising at least a part of component (A) to (C), and optionally (D), streams.

2. The continuous process according to claim 1, wherein the polymerization takes place in at least two tubular reactor segments connected in series.

3. The continuous process according to claim 2, wherein at least two tubular segments are connected in series, wherein the first tubular reactor segment has a first feed side and a first outlet side, wherein the first tubular reactor segment is connected to the second tubular reactor segment via the first outlet side that corresponds to the second feed side of the second tubular segment and whereby at least one recycle stream is removed from the outlet side of at least one tubular reactor segment and recycled to the inlet side of one of the tubular reactor segments.

4. The continuous process according to claim 3, wherein the ratio of the recycle stream to the feed stream is between 1 and 1000.

5. The continuous process according to claim 3, wherein
90-100% of the total amount of component (A) is introduced in the first feed side,
0-60% of the total amount of component (B) is introduced in the first feed side,
10-60% of the total amount of component (C) is introduced in the first feed side,
optionally, 0-100% of the total amount of component (D) is introduced in the first feed side,
whereby the remaining amount of the components (A) to (D) is introduced after the first tubular reactor segment in at least one outlet or inlet side of a subsequent tubular reactor segment.

6. The continuous process according to claim 1, wherein 15 to 85% by weight of a vinyl ester component (B), composed of 70 to 100% by weight of vinyl acetate and/or vinyl propionate (B1) and 0 to 30% by weight of the further ethylenically unsaturated monomer (B2), 15 to 70% by weight of the polyalkylene oxide (A) of mean molecular mass Mn of from 1000 to 20000, 0.1 to 3% by weight, based on compound (B), of the free radical-forming initiator (C) and 0 to 40% by weight, based on the sum of the components (A), (B) and (C), of an additive (D), are used, whereby the sum of which in total does not exceed 100%.

7. The continuous process according to claim 1, wherein at least one feed side, one tubular reactor segment or one outlet side is equipped with a mixer.

8. The continuous process according to claim 1, wherein at least one tubular reactor segment has a relationship of surface to volume of at least 10 $m^2/m^3$.

9. The continuous process according to claim 1, wherein the temperature of the feed side is below the mean polymerization temperature at which the half time of the free radical initiator is more than 5 h.

10. The continuous process according to claim 1, wherein the ratio of the length of at least one tubular reactor segment in the direction of the flow of the stream to the diameter is from 1000:1 to 10:1.

11. The continuous process according to claim 1, wherein at least one tubular reactor segment is a tubular reactor filled with milli-structured filling.

12. The continuous process according to claim 1, wherein the polymerization time is up to 2 hours.

13. The continuous process according to claim 1, wherein the pressure in at least one tubular reactor segment is at least 2 bar.

14. The continuous process according to claim 1, wherein the average residence time of at least one of the components (A), (B), (C) or (D) in at least one tubular reactor segment is in a range from 2 min to 30 min.

15. The continuous process according to claim 1, wherein the local concentration of the component (B) is held constant over time in at least one tubular reactor segment.

16. An amphiphilic graft polymer obtained by free-radical polymerization of
(B) 15 to 85% by weight of a vinyl ester compound composed of
(B1) 70 to 100% by weight of vinyl acetate and/or vinyl propionate and
(B2) 0 to 30% by weight of a further ethylenically unsaturated monomer,
in the presence of
(A) 15 to 70% by weight of a polyalkylene oxide of mean molar mass $M_n$ of from 1500 to 20000 g/mol,
(C) 0.1 to 3% by weight, based on component (B), of a free radical-forming initiator
and
(D) 0 to 40% by weight, based on the sum of the components (A), (B) and (C), of an additive
at a mean polymerization temperature at which the initiator (C) has a decomposition half-time of from 1 to 500 min, in a tubular reactor segment with a feed side and an outlet side, wherein the tubular reactor segment has a relationship of surface to volume from at least 10 $m^2/m^3$ and wherein the sum of the components (A) to (C), and optionally (D), does not exceed 100% by weight.

17. Amphiphilic graft polymer according to claim 16, wherein the polyalkylene oxide (A) is based on C2 to C4-alkylene oxide, which comprises at least 30% by weight of ethylene oxide in copolymerized form.

18. Amphiphilic graft polymer according to claim 16, wherein in the tubular reactor segment the stream of the reaction mixture is held at a mean polymerization temperature T1 at which the initiator (C) has a decomposition half-time from 1 to 500 min and at least one of the components (A), (B), (C) or (D) is metered in the feed side at a temperature T2 at which the initiator (C) has a decomposition half-time above 500 min.

19. Amphiphilic graft polymer according to claim 16, wherein the polylalkylene oxide (A) has a mean molecular weight Mn from 2500 to 15000 g/mol.

20. Amphiphilic graft polymer according to claim 16, wherein the polylalkylene oxide (A) has a polydispersity Mw/Mn of ≤2.5.

21. Amphiphilic graft polymer according to claim 16, wherein the graft polymer has a polydispersity Mw/Mn of ≤3.

22. Amphiphilic graft polymer according to claim 16, wherein the graft polymer has a full width at half maximum of the polarity distribution between >0.35 and <1.0.

* * * * *